(12) United States Patent
Hirata et al.

(10) Patent No.: US 7,357,170 B2
(45) Date of Patent: Apr. 15, 2008

(54) SPLIT RIM FOR TIRE, METHOD OF ASSEMBLING A RIM/TIRE ASSEMBLY, AND METHOD AND DEVICE FOR INSTALLING THE RIM/TIRE ASSEMBLY

(75) Inventors: Yoshiaki Hirata, Kodaira (JP); Akio Oobayashi, Kodaira (JP); Keigo Kikuchi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/552,462

(22) PCT Filed: Apr. 7, 2004

(86) PCT No.: PCT/JP2004/005009

§ 371 (c)(1),
(2), (4) Date: Oct. 7, 2005

(87) PCT Pub. No.: WO2004/090497

PCT Pub. Date: Oct. 21, 2004

(65) Prior Publication Data

US 2006/0219368 A1   Oct. 5, 2006

(30) Foreign Application Priority Data

Apr. 9, 2003   (JP) .............................. 2003-104842
Apr. 9, 2003   (JP) .............................. 2003-105621

(51) Int. Cl.
*B60C 25/00* (2006.01)
(52) U.S. Cl. ..................... 157/18; 157/1.35; 73/146
(58) Field of Classification Search ............... 157/1.35, 157/14–21; 269/48.1; 279/2.1–2.14; 403/31; 73/146; 301/35.2; 152/396; 29/894.31
See application file for complete search history.

(56) References Cited

U.S. PATENT DOCUMENTS

| | | | | |
|---|---|---|---|---|
| 4,023,407 A | * | 5/1977 | Vanderzee | .................... 73/146 |
| 5,257,561 A | * | 11/1993 | Folta | ........................... 82/165 |
| 5,259,242 A | * | 11/1993 | Folta | ........................... 73/146 |

FOREIGN PATENT DOCUMENTS

| | | |
|---|---|---|
| JP | U-03-051348 | 5/1991 |
| JP | A-05-066171 | 3/1993 |
| JP | A-07-027649 | 1/1995 |
| JP | A-10-073518 | 3/1998 |
| JP | A-2001-512566 | 8/2001 |
| JP | A-2003-240682 | 8/2003 |

\* cited by examiner

*Primary Examiner*—D S Meislin
(74) *Attorney, Agent, or Firm*—Oliff & Berridge, PLC

(57) ABSTRACT

A hollow-cylindrical portion (26) inserted in a hollow-cylindrical portion (16) of one rim section (12) is provided on the other rim section (13). To form a split rim (11), part (head portion) of the inner hollow-cylindrical portion (26) overlaid on the outer hollow-cylindrical portion (16) is radially outwardly expanded by being elastically deformed by a tapered surface (39) of a piston (38) such that the inner and outer hollow-cylindrical portions (16, 26) are in close contact with each other. As a result, relative positions of the rim sections (12, 13) are strictly defined, and this enables high assembling accuracy, particularly coaxiality with a high level, to be achieved. A fine fitted to the split rim (11) can be inspected with high accuracy.

7 Claims, 11 Drawing Sheets

SPLIT RIM FOR TIRE, METHOD OF ASSEMBLING A RIM/TIRE ASSEMBLY, AND METHOD AND DEVICE FOR INSTALLING THE RIM/TIRE ASSEMBLY

This application is a 371 of PCT/JP04/05009, filed 7 Apr. 2004.

BACKGROUND OF THE INVENTION

1. Field of the Invention

The present invention relates to a split rim for a pneumatic tire assembled by one rim section and the other rim section, a method of assembling a rim/tire assembly to have a rim/tire assembly by assembling a pneumatic tire and the rim sections, and a method and a device for installing the rim/tire assembly onto a member to be attached, for inspection of a pneumatic tire or the like.

2. Background Art

In general, a method for inspecting a pneumatic tire has been conducted by a method described in JP-A-5-187952. That is, after a pneumatic tire has been conveyed between an upper rim section and a lower rim section of an inspecting machine such as a uniformity-testing machine, the lower rim section is raised to bring the lower rim section to be seated on a lower bead portion of the pneumatic tire. After this seating, the lower rim section is further raised till the upper rim section is seated on an upper bead portion of the pneumatic tire. Next, after filling a fluid between the pneumatic tire and the upper and the lower rim sections, the pneumatic tire and the upper and the lower rim sections are rotated integrally about a rotation center during which the pneumatic tire is inspected.

With this method, however, the seating of the pneumatic tire on the upper and the lower rim sections and the fluid filling as a preparation work for the inspection are performed in the inspecting machine. Thus, even if the inspection time itself is short, a cycle time from conveying-in of the pneumatic tire to that of the next pneumatic tire becomes long. As a result, working efficiency is deteriorated, which is a problem.

As first proposal to solve such a problem, as described in International Publication No. WO 03/048718, such a tire inspecting method is known that, at an assembling station, after a one-side bead portion of the pneumatic tire is seated on a one-side rim section and the other-side bead portion on the other-side rim section, these one-side and the other side rim sections are fastened together to form a split rim on which the pneumatic tire is attached, that is, a rim/tire assembly, and then, the rim/tire assembly is conveyed to a tire inspecting machine installed at an inspecting station, where the rim/tire assembly is coupled to the rotating shaft of the tire inspecting machine. Next, the rotating shaft and the rim/tire assembly are rotated integrally, during which the pneumatic tire is inspected. As a split rim made of the above-mentioned one-side and the other-side rim sections, a halved rim section that is conventionally used when attaching a pneumatic tire on an industrial vehicle or the like can be adopted.

As a second proposal to solve the above problem, as described in JP-A-2003-240682, such a method is also known that comprises a process for conveying a rim/tire assembly made of a pneumatic tire, a one-side rim section on which a one-side bead portion of the pneumatic tire is seated, and the other-side rim section on which the other-side bead portion of the pneumatic tire is seated and which is detachably connected to the one-side rim section onto a member to be attached constituting a part of an inspecting machine, and a process for having a first fluid passage formed in the member to be attached to communicate to a second fluid passage formed in the rim/tire assembly by loading the conveyed rim/tire assembly to a predetermined position of the member to be attached so that a fluid is introduced between the one-side and the other-side rim sections and the pneumatic tire through these first and the second fluid passages.

However, as for the halved rim sections as shown in the first proposal, the one-side and the other-side rim sections are fastened to each other by holding inner flanges formed at the inner ends of the one-side and the other-side rim sections in the axial direction, respectively, with a bolt and a nut. Therefore, the assembling accuracy of the one-side and the other-side rim sections after the fastening, especially, the concentricity deteriorates, thereby adversely affecting the inspection results, which is another problem.

As for the second proposal, too, when attaching the rim/tire assembly onto the member to be attached, the rim/tire assembly is merely loaded on the member to be attached. Thus, attachment position of the rim/tire assembly is likely to be offset with respect to the member to be attached, and also, there is a fear of slippery in the rotating direction between the rim/tire assembly and the member to be attached at inspection. Therefore, this proposal also has a problem that the inspection results are adversely affected as in the first proposal.

The present invention has been made in view of the above problems and has an object to provide a split rim for a tire, a method of assembling a rim/tire assembly, and a method and a device for installing the rim/tire assembly which can obtain inspection results with high accuracy, in inspecting a tire by installing the rim/tire assembly which is an assembly of the split rim comprising the one-side and the other-side rim sections and the tire onto a member to be attached.

DISCLOSURE IF THE INVENTION (1) The present invention in its first aspect provides a split rim for a tire comprising a one-side rim section on which a one-side bead portion of a pneumatic tire is seated and which has a cylindrical portion in the approximately cylindrical shape projecting inward in the axial direction, the other-side rim section on which the other-side bead portion of the pneumatic tire is seated and which has a cylindrical portion in the approximately cylindrical shape projecting inward in the axial direction and inserted into the cylindrical portion of the one-side rim section, a fastening means for fastening the one-side and the other-side rim sections to each other when the cylindrical portions of the one-side and the other-side rim sections are overlaid due to the insertion, and an expanding means for expanding a part of the inner cylindrical portion at the overlaid part outward in the radial direction to bring the inner and the outer cylindrical portions into close contact.

According to the first aspect of the present invention, since the cylindrical portion is provided on the other-side rim section to be inserted into the cylindrical portion on the one-side rim section and the expanding means for expanding a part of the inner cylindrical portion overlaid on the outer cylindrical portion outward in the radial direction to bring the inner and the outer cylindrical portions into close contact with each other, the relative positions of the one-side and the other-side rim sections are strictly defined, and the assembling accuracy of them after fastening, especially, concentricity becomes highly accurate, by which inspection accuracy of a pneumatic tire can be improved.

(2) The present invention in its second aspect provides a split rim for a tire according to the item (1), wherein the expanding means comprises a piston to be movably inserted into either of the cylindrical portions in the axial direction and having a tapered surface whose thickness is gradually reduced toward the tip end, and a fluid chamber for expanding a part of the inner cylindrical portion by the tapered surface of the piston by having a fluid pressure to act on the piston to move it toward the tip end when a fluid is supplied.

The structure according to the second aspect of the present invention can surely expand a part of the inner cylindrical portion with a simple structure.

(3) The present invention in its third aspect provides a split rim for a pneumatic tire, according to the item (1) or (2), wherein the fastening means is provided on either of the one-side rim section or the other-side rim section with an equal distance from the rotation center and comprises a shaft body extending toward the other remaining rim section in the axial direction, a plurality of fastening shafts made of projections projected outward from the shaft body, and a plurality of penetrating fastening holes formed on the other remaining rim section with an equal distance from the rotation center and made of a large hole portion through which the projections can pass in the axial direction and an arc portion extending from each of the large hole portions toward the one side in the circumferential direction and having the width which is the same as or larger than the shaft body and smaller than the projections.

The structure according to the third aspect of the present invention can strongly fasten the one-side and the other-side rim sections to each other with a simple structure.

(4) The present invention in its fourth aspect provides a split rim for a pneumatic tire according to any of the items (1) to (3), wherein the fastening means can fasten the one-side rim section and the other-side rim section at a plurality of positions in the axial direction.

The structure according to the fourth aspect of the present invention can attach a pneumatic tire with a different inter-bead portion distance to the same one-side and the other-side rim sections.

(5) The present invention in its fifth aspect provides a split rim for a pneumatic tire according to the item (3), wherein a plurality of projections are provided equally spaced from each other on the shaft body in the axial direction so that the one-side rim section and the other-side rim section can be fastened at a plurality of axial positions.

The structure according to the fifth aspect of the present invention enables assured fastening of the one-side and the other-side rim sections to each other with offsetting by a predetermined pitch at a plurality of fastening positions with a simple structure.

(6) The present invention in its sixth aspect provides a method of assembling a rim/tire assembly comprising a process of overlaying cylindrical portions of a one-side and the other-side rim sections by seating a one-side bead portion of a pneumatic tire on the one-side rim section and the other-side bead portion on the other side rim section as well as by inserting the cylindrical portion in the approximately cylindrical shape of the other-side rim section projecting inward in the axial direction into the cylindrical portion in the approximately cylindrical shape of the one-side rim section projecting inward in the axial direction, and a process of bringing the cylindrical portions on the inner and the outer sides into close contact by fastening the one-side and the other-side rim sections to each other with a fastening means and expanding a part of the inner cylindrical portion at the overlaid part outward in the radial direction with an expanding means.

According to the sixth aspect of present invention, the relative positions of the one-side and the other-side rim sections can be strictly defined by the above processes, a rim/tire assembly can be assembled simply and surely with highly accurate assembling between the rim sections, particularly, the concentricity, by which the inspection accuracy of the pneumatic tire can be improved.

(7) The present invention in its seventh aspect provides a method for installing a rim/tire assembly comprising a process of conveying a rim/tire assembly made of a pneumatic tire, a one-side rim section on which a one-side bead portion of the pneumatic tire is seated, and the other-side rim section on which the other-side bead portion of the pneumatic tire is seated and which is detachably coupled to the one-side rim section onto a member to be attached, and a process to attach and fix the above-conveyed rim/tire assembly to a predetermined position of the member to be attached with an attaching means as well as to have a first fluid passage formed in the member to be attached to communicate to a second fluid passage formed in the rim/tire assembly and to introduce a fluid between the one-side and the other-side rim sections and the pneumatic tire through the first and the second fluid passages.

According to the seventh aspect of the present invention, since the conveyed rim/tire assembly is attached/fixed at a predetermined position of the member to be attached with the attaching means, slippery in the rotating direction does not occur between the assembly and the member to be attached even if an inertia force and a braking force acts at inspection or the like, by which a highly accurate inspection result can be obtained.

Moreover, since the rim/tire assembly is attached/fixed at a predetermined position of the member to be attached with the attaching means, displacement of the attachment position of the rim/tire assembly with respect to the member to be attached is eliminated, and as a result, leakage of the fluid introduced between the one-side and the other-side rim sections and the pneumatic tire through the first and the second fluid passages can be prevented.

(8) The present invention in its eighth aspect provides a device for installing a rim/tire assembly comprising a conveying means for conveying a rim/tire assembly made of a pneumatic tire, a one-side rim section on which a one-side bead portion of the pneumatic tire is seated, and the other-side rim section on which the other-side bead portion of the pneumatic tire is seated and which is detachably coupled to the one-side rim section into a member to be attached, an attaching means for attaching/fixing the conveyed rim/tire assembly to a predetermined position of the member to be attached, and a second fluid passage formed in the rim/tire assembly for introducing a fluid from a first fluid passage between the one-side and the other-side rim sections and the pneumatic tire when being made to communicate to the first fluid passage formed in the member to be attached.

According to the eighth aspect of the present invention, since the conveyed rim/tire assembly is attached/fixed by the attaching means at a predetermined position of the member to be fixed, inspection results with high accuracy can be obtained as with the invention in (7), and also, leakage of the fluid introduced between the one-side and the other-side rim sections and the pneumatic tire can be prevented.

(9) The present invention in its ninth aspect provides a device for installing a rim/tire assembly according to the item (8), wherein tapered surfaces with the same tapering angle and capable of surface contact with each other are formed on a contact portion between the attached/fixed rim/tire assembly and the member to be attached, respectively, and a force applying means is provided for applying a press-contact force to press these tapered surfaces into contact with each other.

The structure according to the ninth aspect of the present invention can effectively improve the attachment accuracy, e.g., concentricity, of the rim/tire assembly with respect to the member to be attached.

(10) The present invention in its tenth aspect provides a device for installing device a rim/tire assembly according to the item (8) or (9), wherein an opening/closing valve is provided in the second fluid passage, and an opening member is provided on the member to be attached for switching the opening/closing valve to an open state when the rim/tire assembly is attached/fixed to the member to be attached.

The structure according to the tenth aspect of the present invention enables conveyance of the rim/tire assembly with internal pressure filled since the opening/closing valve is switched to the closed state when the rim/tire assembly is removed from the member to be attached.

(11) The present invention in its eleventh aspect provides a device for installing a rim/tire assembly according to any of the items (8) to (10), wherein the installing means is provided with a holder provided on the member to be attached and to which a coupling portion of the rim/tire assembly can be inserted, a ball to be inserted into each of a plurality of ball holes formed on the holder and having the diameter larger than the thickness of the holder, a slider slidably fitted on the outside of the holder and pressing the ball inward, when the inner surface is engaged with the ball, and a recess formed on the outer surface of said coupling portion and capable of insertion of a part of the ball when the ball is pressed inward.

The structure according to the eleventh aspect of the present invention enables attachment/fixation of the rim/tire assembly to the member to be attached in an extremely short time.

(12) The present invention in its twelfth aspect provides a device for installing for a rim/tire assembly according to any of the items (8) to (11), wherein a positioning means is provided for positioning/fixing positions in the rotating direction of the rim/tire assembly and the member to be attached.

The structure according to the twelfth aspect of the present invention can make the positions in the rotating direction of the rim/tire assembly and the member to be attached at attachment/fixation constant all the time, and by this, communication between the first and the second fluid passages can be ensured and the state where the rim/tire assembly slips in the rotating direction with respect to the member to be attached when the rim/tire assembly is rotating can be surely prevented.

BEST MODE FOR CARRYING-OUT THE INVENTION

The first preferred embodiment of a split rim according to the present invention will be described below based on the drawings.

Figure 1:
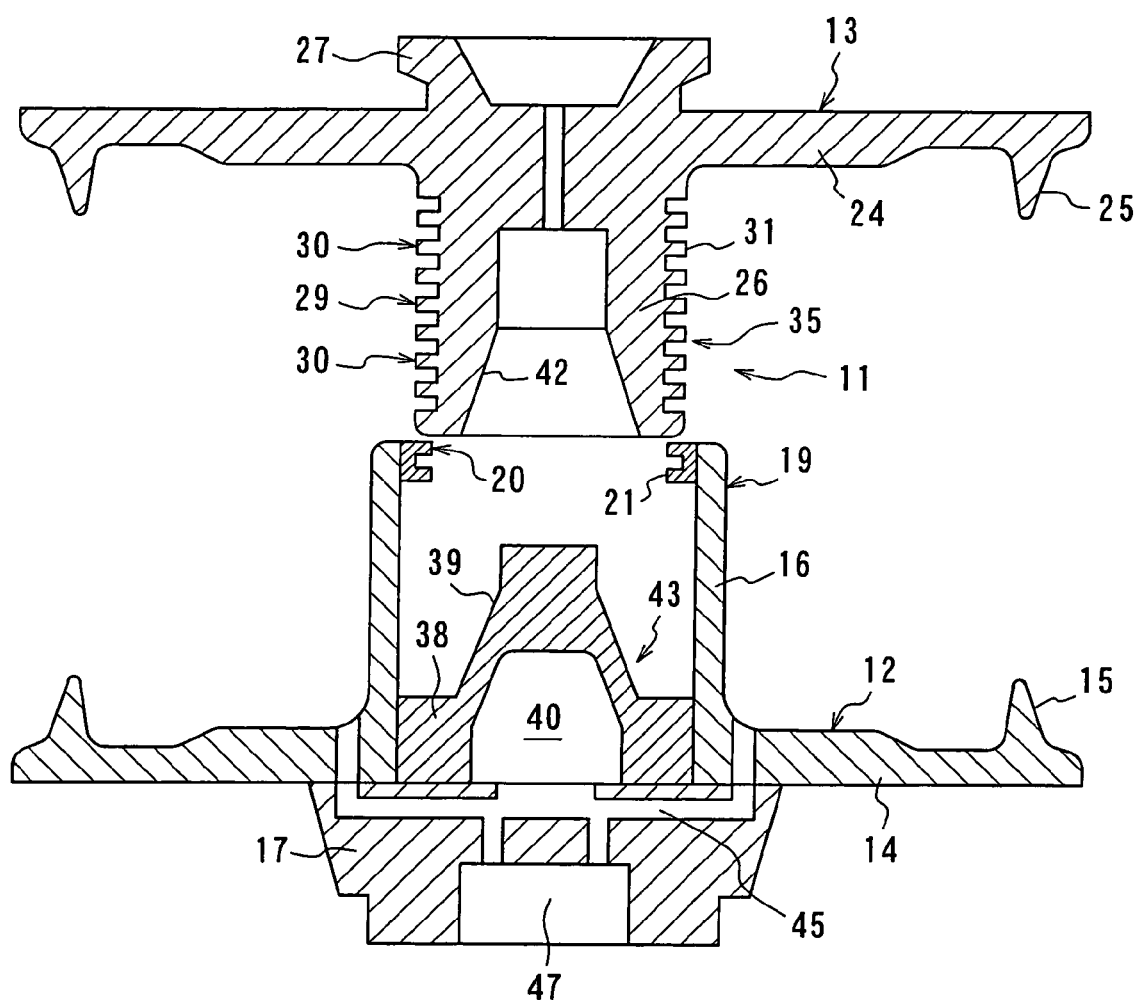
FIG. 1 is a front sectional view showing a first preferred embodiment of a split rim according to the present invention when a one-side rim section and the other-side rim section are separated.
Figure 2:
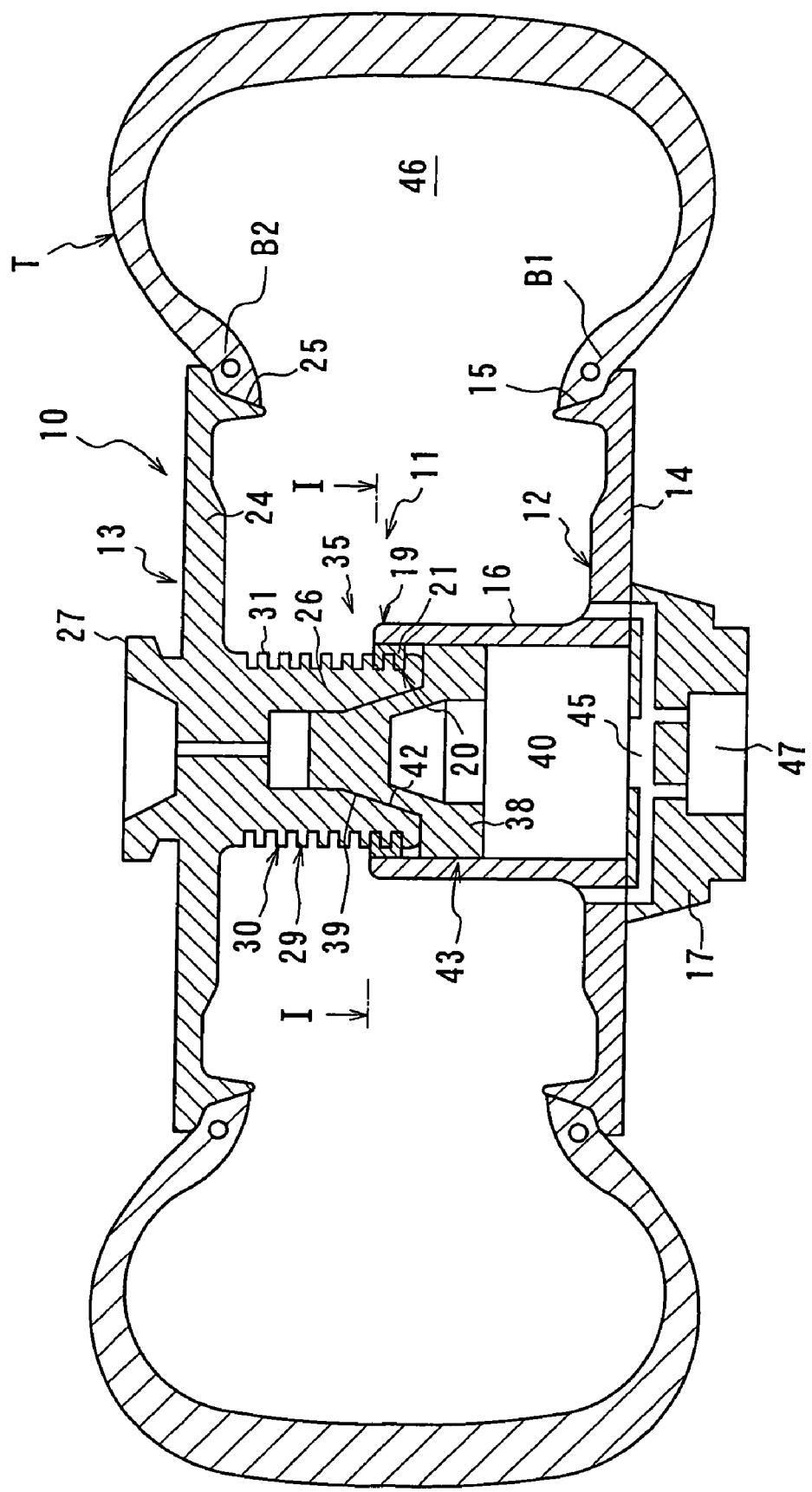
FIG. 2 is a front sectional view of a split rim for a pneumatic tire.

In FIGS. 1 and 2, reference numeral 11 denotes a split rim to which a pneumatic tire T is to be attached at inspection or the like of the pneumatic tire T, and this split rim 11 has a one-side rim section 12 located on the lower side and the other-side rim section 13 located above. The one-side rim section 12 has a disk portion 14 almost in the disk shape, a flange state here, and at the outer end in the radial direction of this disk portion 14, a bead seat portion 15 on which one side (lower side) bead portion B1 of the pneumatic tire T is seated is provided. Reference numeral 16 denotes a cylindrical portion almost in the cylindrical shape which is coaxial with the disk portion 14, and the lower end of this cylinder portion 16 is integrally connected to the inner end of the disk portion 14 in the radial direction. Also, on the lower surface in the center part of the disk portion 14, a projecting block 17 projecting from the disk portion 14 is fixed, and as a result, the upper-end opening of this cylinder portion 16 is opened, while the lower-end opening is closed by the projecting block 17.

Figure 3:
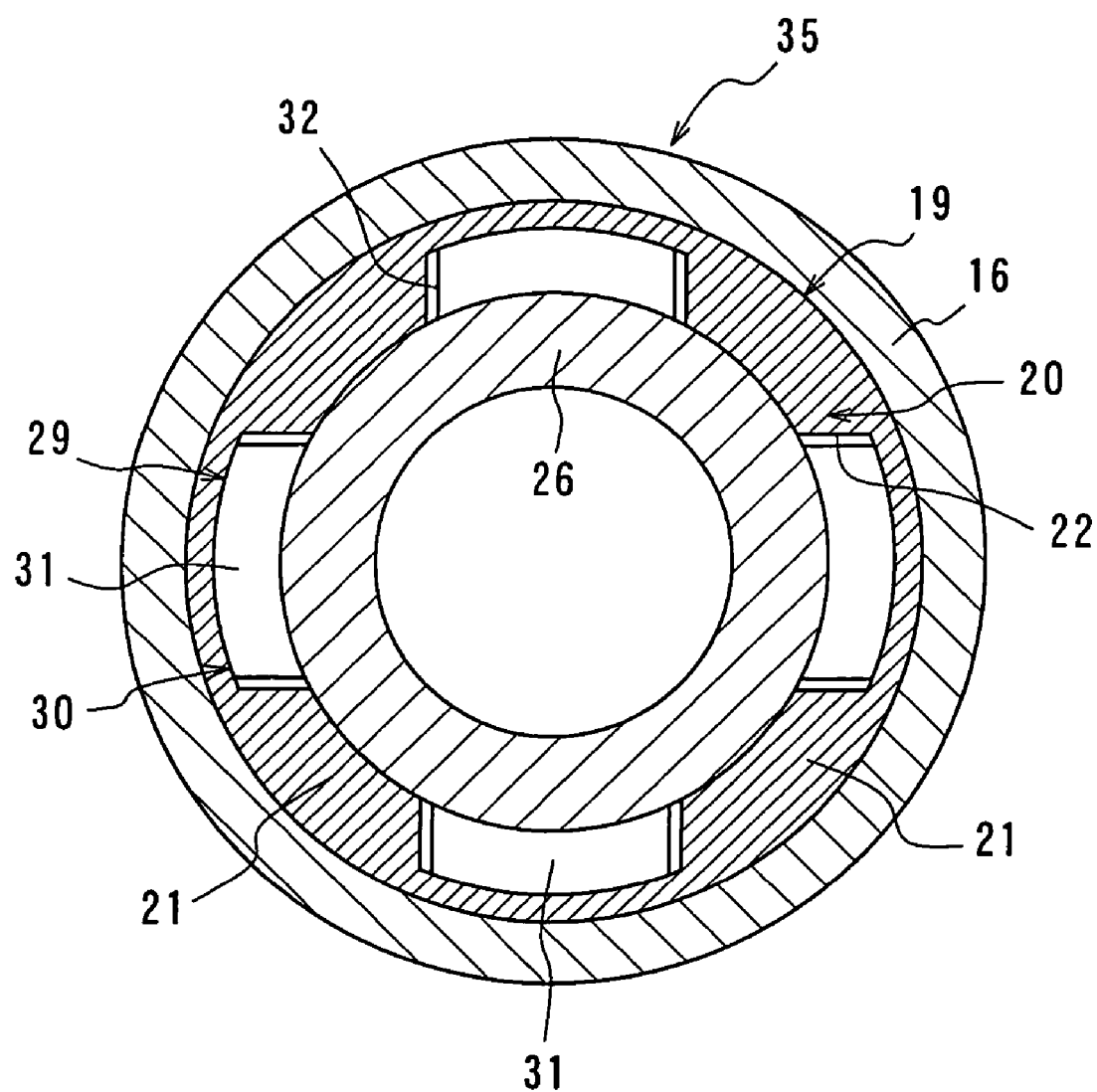
FIG. 3 is a sectional view seen by an arrow I-I in FIG. 2.

In FIGS. 1, 2 and 3, reference numeral 19 denotes a one-side fastening mechanism provided on the inner circumference of the tip end (upper end) of the cylinder portion 16, and this one-side fastening mechanism 19 is comprised by at least one stage of, or two stages separated in the axial direction here of claw groups 20. And the distance between these claw groups 20 in the axial direction is slightly larger than the thickness of a claw 31 of the other-side rim section 13. Each of the claw groups 20 is comprised by a plurality of, 4 arc-state here of claws 21 separated with an equal angle in the circumferential direction and projecting inward in the radial direction, and a clearance 22 almost in the same shape as the claw 21 is formed between two adjacent claws 21.

In the meantime, the other-side rim section 13 has a disk portion 24 almost in the disk shape, and at the outer end of this disk portion 24 in the radial direction, a bead seat portion 25 on which the other side (upper side) bead portion B2 of the pneumatic tire T is seated is provided. Reference numeral 26 denotes a cylindrical portion almost in the cylindrical shape which is coaxial with the disk portion 24, and the upper end of this cylinder portion 26 is integrally connected to the lower surface of the disk portion 24. Also, on the upper surface in the center part of the disk portion 24, a gripping block 27 gripped by a conveying means, not shown, when the split rim 11 is conveyed, is integrally connected.

Reference numeral 29 denotes the other-side fastening mechanism provided on the outer circumference of the cylinder portion 26, and this other-side fastening mechanism 29 is comprised by plural stages in the number larger than that of the claw groups 20, 7 stages here of claw groups 30, and these claw groups 30 are separated with an equal distance in the axial direction from the claw groups 20. And the distance between each of the claw groups 30 in the axial direction is slightly larger than the thickness of the claw 21 of the one-side rim section 12. Each of the claw groups 30 is comprised by a plurality of, 4 arc-state here of claws 31 separated with an equal angle in the circumferential direction and projecting outward in the radial direction, and a clearance 32 almost in the same shape as the claw 31 is formed between two adjacent claws 31.

And when combining the one-side rim section 12 with the other-side rim section 13, the other-side rim section 13 in the coaxial relation with the one-side rim section 12 is lowered immediately the one-side rim section 12, and the cylinder portion 26 is inserted into the cylinder portion 16. At this time, the claw 31 of the other-side fastening mechanism 29 passes through the clearance 22 in the axial direction formed between the claws 21 of the one-side fastening mechanism 19, and the insertion is performed smoothly without interference between the claws 21 and 31.

And when the cylinder portion 26 is inserted into the cylinder portion 16 by a predetermined amount, the other-side rim section 13 is relatively rotated around the rotating center only by 45 degrees with respect to the one-side rim section 12, and by this, the claws 21 and 31 of these one-side and the other-side fastening mechanisms 19 and 29 are overlaid in the axial direction, and the one-side and the other-side rim sections 12 and 13 are fastened in the cylinder portions 16 and 26. The above-mentioned one-side fastening mechanism 19 and the other-side fastening mechanism 29 constitute as a whole a bayonet type fastening means 35 for fastening these one-side and the other-side rim sections 12 and 13 to each other when the cylinder portions 16 and 26 of the one-side and the other-side rim sections 12 and 13 overlap each other due to insertion.

And when the one-side and the other-side rim sections 12 and 13 are fastened to each other by the fastening means 35 in the state where the one-side and the other-side bead portions B1 and B2 of the pneumatic tire T are seated on the one-side and the other-side rim sections 12 and 13, respectively, as mentioned above, these one-side and the other-side rim sections 12, 13 and the pneumatic tire T are assembled to constitute a rim/tire assembly 10.

Also, in the fastening means 35, the other-side fastening mechanism 29 is comprised by plural stages of the claw groups 30 separated in the axial direction, and depending on with which claw group 30 the claw group 20 of the one-side fastening mechanism 19 is to be engaged, the one-side rim section 12 and the other-side rim section 13 can be fastened to each other at a plurality of positions in the axial direction. And by constituting so that the one-side rim section 12 and the other-side rim section 13 can be fastened to each other at a plurality of positions in the axial direction in this way, even a pneumatic tire T with different distance between the bead portions B1 and B2 can be attached easily onto the same split rim 11.

Reference numeral 38 denotes a piston inserted into the cylinder portion 16 of the one-side rim section 12 capable of movement in the axial direction (vertical direction), and this piston 38 has a tapered surface 39 made of a part of a conical surface tapered toward the tip end (upper end) side on the outer circumference to the upper end. Reference numeral 40 denotes a fluid chamber surrounded and defined by the piston 38, the cylinder portion 16 and the projecting block 17, and when a fluid such as air, inert gas, etc. is supplied to this fluid chamber 40, the piston 38 receives a fluid pressure and moves to the tip end side (upward).

In the meantime, on the inner circumference of the lower end of the cylinder portion 26 of the other-side rim section 13, a tapered surface 42 made of a part of a conical surface tapered toward the base end side (upward) is formed, and this tapered surface 42 is inclined with the same gradient as the tapered surface 39. And when the fluid is supplied to the fluid chamber 40 and the piston 38 is moved to the tip end side in the cylinder portion 16 as mentioned above and the tapered surface 39 is pressed into surface contact with the tapered surface 42, a part of the cylinder portion 26 inserted in the cylinder portion 16, the tip end (lower end) here is evenly and elastically deformed and slightly expanded on the entire length outward in the radial direction.

The piston 38 having the above-mentioned tapered surface 39 and the fluid chamber 40 generally expand only a part (tip end) of the inner cylinder portion 26 at the overlap part of the cylinder portions 16 and 26 outward in the radial direction by a wedge action and constitute an expanding means 43 for bringing the inner and the outer cylinder portions 26 and 16, more particularly, either or both of the inner circumference of the claw 21 and the outer circumference of the cylinder portion 26 or the outer circumference of the claw 31 and the inner circumference of the cylinder portion 16 in close contact with each other. By constituting the expanding means 43 with the piston 38 and the fluid chamber 40 in this way, a part of the inner cylinder portion 26 can be expanded surely with a simple structure.

Reference numeral 45 denotes a fluid passage formed in the one-side rim section 12 and the projecting block 17, and one end of this fluid passage 45 is opened on the lower end face of the projecting block 17, while the other side portions branches and communicates to the fluid chamber 40 and a tire chamber 46 surrounded by the one-side and the other-side rim sections 12, 13 and the pneumatic tire T. Also, in the fluid passage 45, an opening/closing valve 47 is housed, and this opening/closing valve 47 is closed normally. And when the above-mentioned rim/tire assembly 10 is set on a support platform, not shown, for assembling work, uniformity or balance inspection, etc., the opening/closing valve 47 is opened, and a fluid at a set pressure is supplied to the fluid passage 45, the fluid chamber 40 and the tire chamber 46 through the support platform from a fluid source, not shown.

Next, action of this split rim 11 will be described. When assembling the above-mentioned rim/tire assembly 10, the gripping block 27 of the one-side and the other-side rim sections 12, 13 fastened to each other by the fastening means 35 is conveyed to an assembling station, while being gripped by a conveying means, and set on the support platform. After that, by rotating the other-side rim section 13 only by 45 degrees by the conveying means, the claw 31 of the other-side rim section 13 is positioned in the clearance 22 between the claws 21 of the one-side rim section 12 to prevent the claws 21 and 31 from interfering with each other.

The other-side rim section 13 is raised by the conveying means in this state and removed from the one-side rim section 12. After that, the pneumatic tire T is conveyed to the assembling station by the conveying means and fitted to the outside of the one-side rim section 12 in the laterally placed state. By this, the one-side bead portion B1 of the pneumatic tire T is seated on the bead seat portion 15 of the one-side rim section 12. Next, the other-side rim section 13 which has been waiting immediately above the one-side rim section 12 is lowered by the conveying means and its cylinder portion 26 is inserted into the cylinder portion 16 of the one-side rim section 12. At this time, too, the claw 31 of the other-side fastening mechanism 29 passes through the clearance 22 formed between the claws 21 of the one-side fastening mechanism 19 in the axial direction, and the claws 21 and 31 do not interfere with each other.

And when the cylinder portion 26 is inserted into the cylinder portion 16 by a predetermined amount, the other-side rim section 13 is relatively rotated by the conveying means only by 45 degrees with respect to the one-side rim section 12. By this, the claws 21, 31 of these one-side and the other-side fastening mechanisms 19, 29 are overlapped with each other in the axial direction so that the one-side and the other-side rim sections 12, 13 are fastened to each other, and the other-side bead portion B2 of the pneumatic tire T is seated on the bead seat portion 25 of the other-side rim section 13, by which the rim/tire assembly 10 is assembled simply and surely.

Here, if the insertion amount (overlapping amount) is changed so that the claw group 20 is to be engaged with the different claw group 30, the distance between the bead seat portions 15, 25 of the one-side and the other-side rim sections 12, 13 can be adjusted according to the distance (foot width) between the bead portions B1, B2 of the pneumatic tire T to be attached. As a result, even if the distance between the bead portions B1, B2 of the pneumatic tire T is different, the pneumatic tire T can be easily attached to the same one-side and the other-side rim sections 12, 13, by which work is simplified and the manufacturing costs are reduced.

Next, the opening/closing valve 47 is opened to supply the fluid at the set pressure to the fluid chamber 40 and the tire chamber 46 through the support platform and the fluid passage 45 from the fluid source. By this, a fluid force in the direction to separate the one-side and the other-side rim sections 12, 13 from each other is applied, the overlapped claws 21, 31 are pressed into contact, and by this, the rim width in the split rim 11 is set to a regulated value, and the relative rotation of the one-side and the other-side rim sections 12, 13 is strongly regulated.

Also, when the fluid is supplied to the fluid chamber 40 as mentioned above, the piston 38 receives the fluid pressure and moves in the axial direction in the cylinder portion 16 till the tapered surface 39 is pressed into contact with the tapered surface 42 and causes a part (tip end) of the inner cylinder portion 26 in the overlapping part of the cylinder portions 16, 26 to expand outward in the radial direction by the wedge action so that the inner and the outer cylinder portions 26, 16 are partially brought into close contact. By this, the relative positions of the one-side and the other-side rim sections 12, 13 are strictly regulated and their assembling accuracy, particularly concentricity, becomes high, by which the inspection accuracy of the pneumatic tire T can be improved.

The rim/tire assembly 10 thus assembled is conveyed by the conveying means from the assembling station to the inspection station, where inspection of uniformity, balance, etc. is conducted, but since the opening/closing valve 47 is closed during such conveyance, the state where the fluid chamber 40 and the tire chamber 46 are filled with fluid can be maintained.

Figure 4:
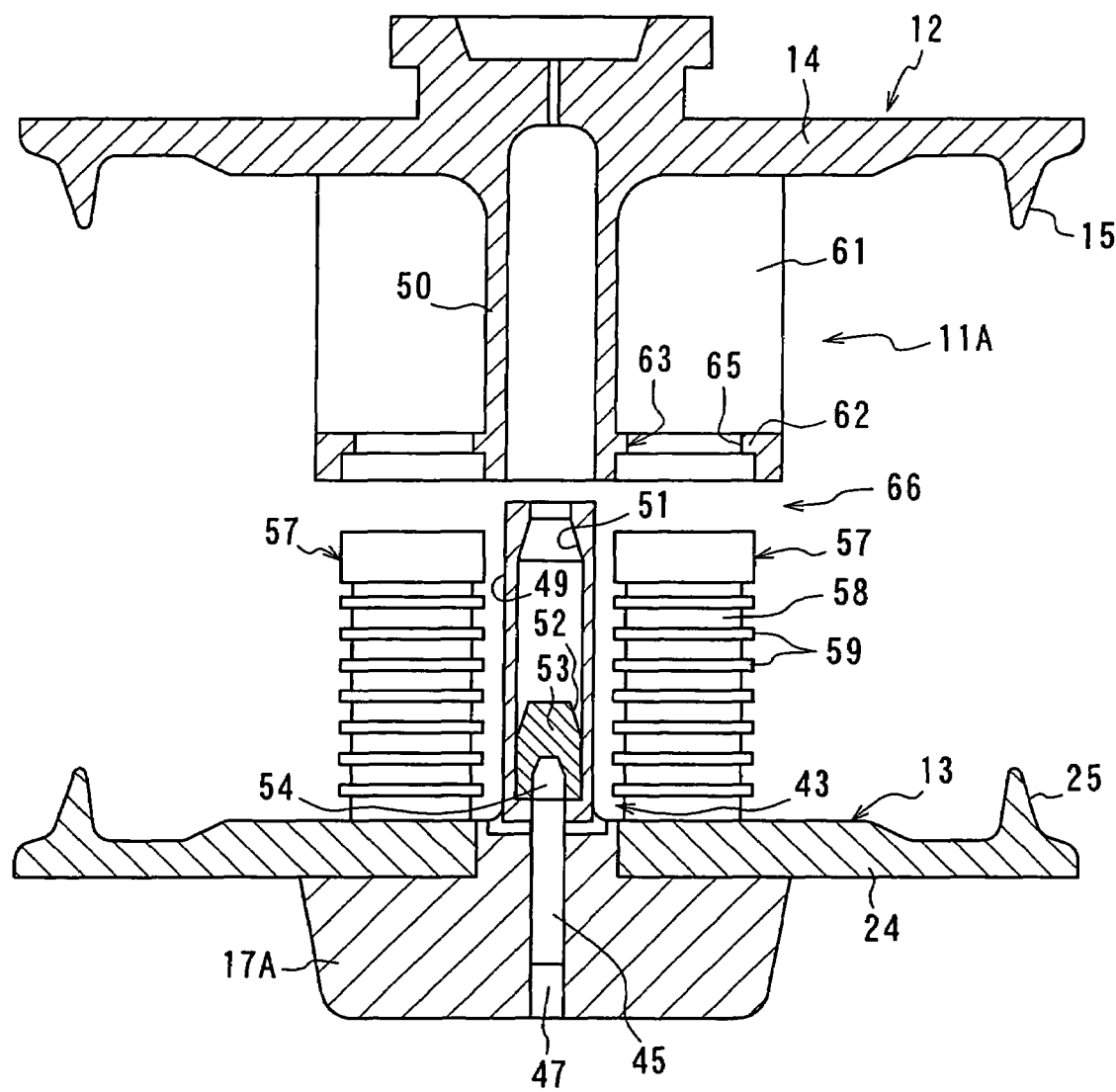
FIG. 4 is a front sectional view showing a second preferred embodiment of a split rim when a one-side rim section and the other-side rim section are separated.
Figure 5:
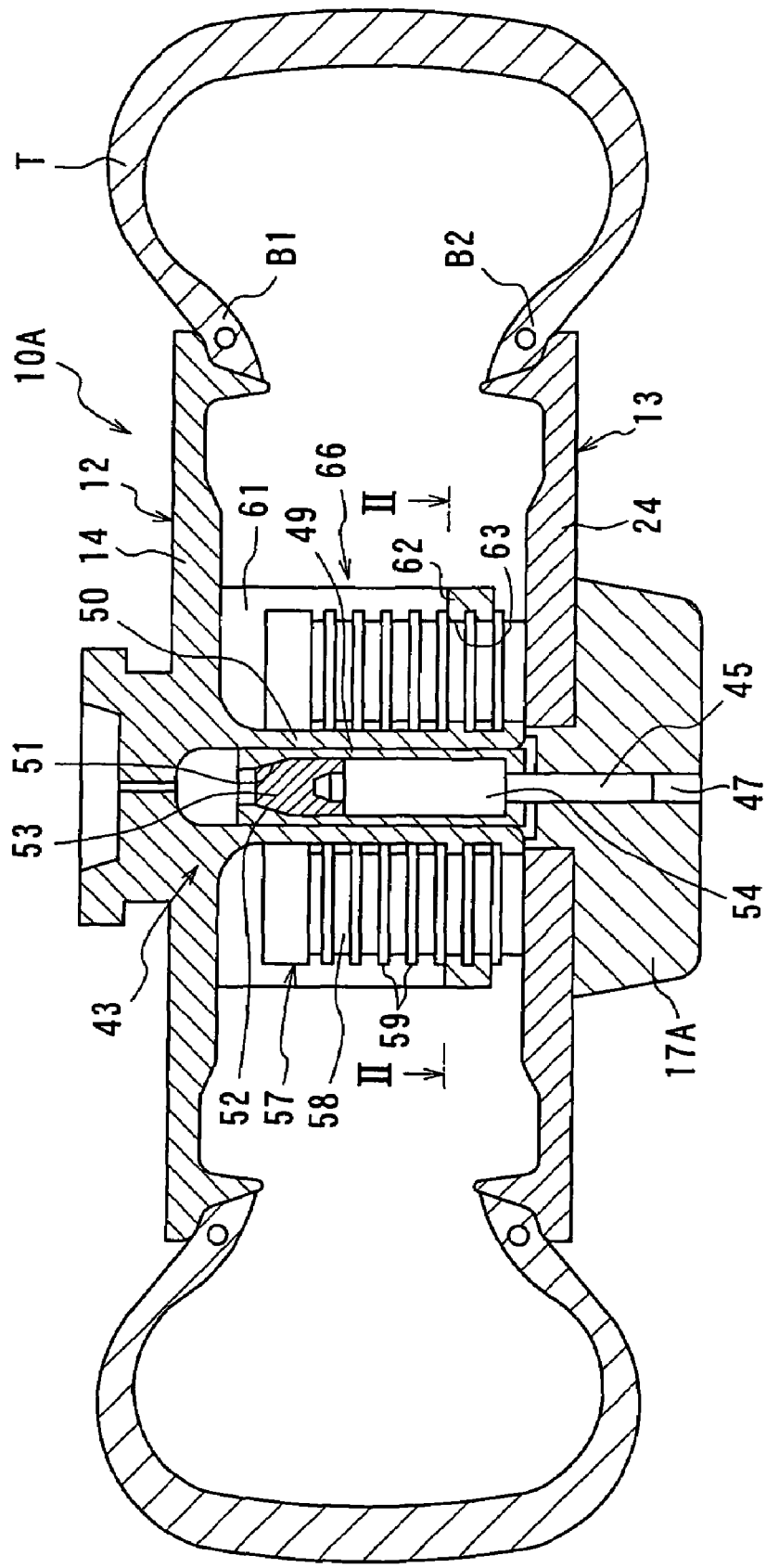
FIG. 5 is a front sectional view of a split rim for a pneumatic tire.
Figure 6:
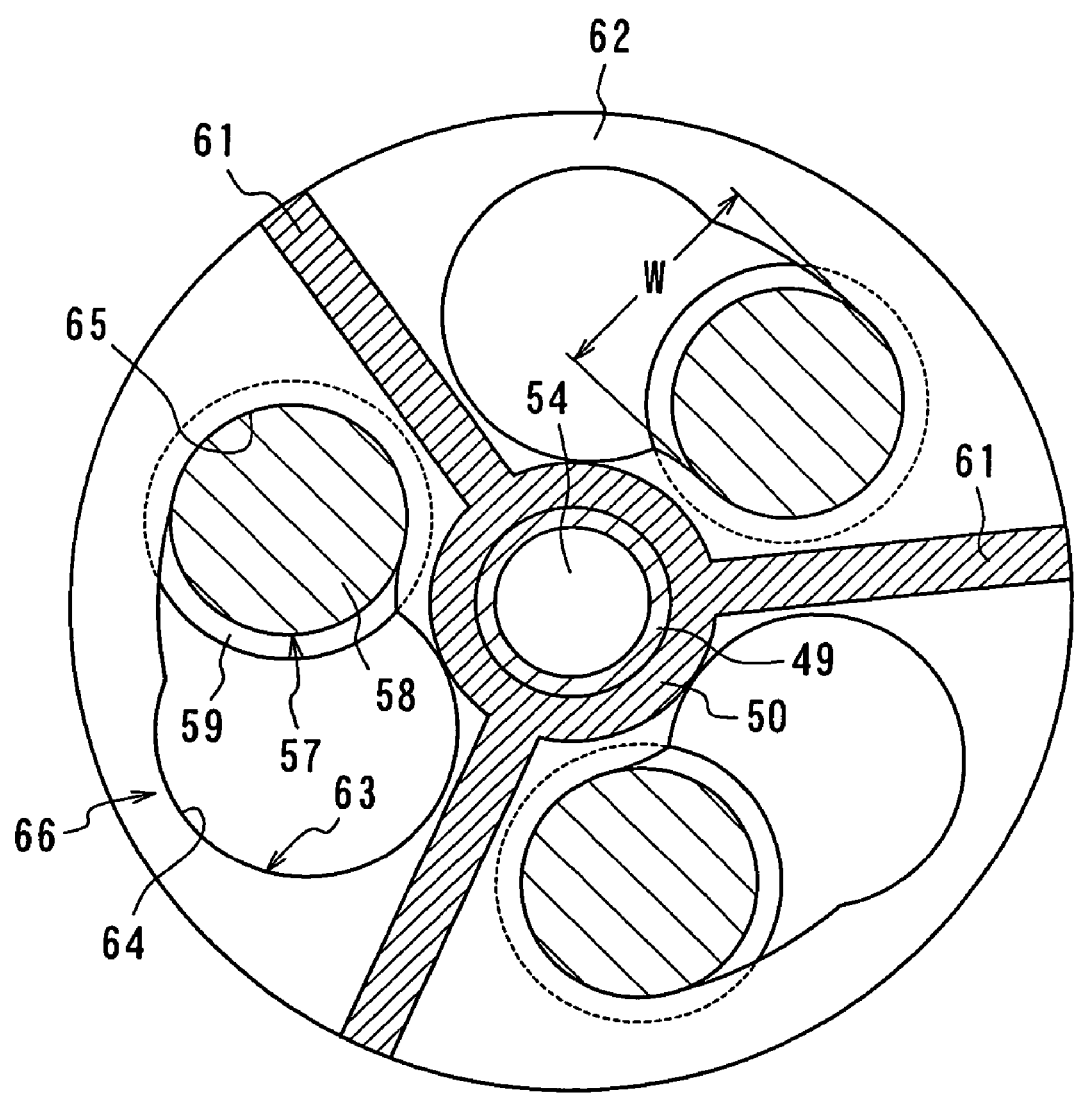
FIG. 6 is a sectional view seen by an arrow II-II in FIG. 5.

FIGS. 4, 5 and 6 are views showing a second preferred embodiment of the split rim according to the present invention. In this preferred embodiment, the lower rim section on which a cylinder portion 49 to be inserted inward is provided is the other-side rim section 13, while the upper rim section with a cylinder portion 50 into which the cylinder portion 49 is inserted provided is the other-side rim section 12. Here, the cylinder portion 49 has a projecting block 17A integrally connected to its lower end and is fixed to the other-side rim section 13. Though the other-side fastening mechanism 29 comprised by the claw group 30 is not provided on the outer circumference of the tip end (upper end) of the cylinder portion 49, a tapered surface 51 made of a part of a conical surface tapered toward the tip end (upper end) is formed on the inner circumference of the tip end.

And into this inner cylinder portion 49, a piston 53 having a tapered surface 52 tapered toward the tip end on the outer circumference of the tip end is housed movably in the axial direction, and by the fluid supplied to a fluid chamber 54 between the piston 53 and the cylinder portion 49, the piston 53 is raised till the tapered surface 52 is pressed into contact with the tapered surface 51 so that a part (tip end) of the cylinder portion 49 is expanded.

Also, in a split rim 11A of this preferred embodiment, a plurality, three pieces here, of fastening shafts 57 extending in the axial direction toward (upward) the one-side rim section 12 are provided on the upper surface of the other-side rim section 13. These fastening shafts 57 are separated from the rotation center of the other-side rim section 13 with an equal distance in the radial direction and arranged in the circumferential direction with an equal angle apart. Each of the fastening shafts 57 is comprised by a columnar shaft body 58 extending in the axial direction and a fastening flange 59 in the ring state as a projecting portion projecting outward in the radial direction from the outer circumference of the shaft body 58, and a plurality, only 7 pieces here, of the fastening flange 59 are provided on the outer circumference of the shaft body 58 with an equal distance apart in the axial direction.

In the meantime, on the cylinder portion 50, a fastening plate 62 almost in the collar shape in parallel with the disk portion 14 and constituting a part of the one-side rim section 12 is integrally formed on the outer circumference of the lower end, and the thickness of this fastening plate 62 is slightly smaller than the distance between the adjacent fastening flanges 59. Also, the fastening plate 62 is reinforced by a plurality, 3 pieces here, of reinforcing ribs 61 integrally formed with the disk portion 14 and the cylinder portion 50 and separated in the circumferential direction with an equal angle. The fastening plate 62 between the reinforcing ribs 61 has a plurality (3 pieces, the same number as that of the fastening shafts 57) of fastening holes 63 formed penetrating each thereof in the axial direction, and these fastening holes 63 are also separated from the rotation center of the one-side rim section 12 by a distance equal to the distance between the rotation center of the other-side rim section 13 and the fastening shaft 57.

Each of the fastening holes 63 is comprised by a large hole portion 64 through which the fastening flange 59 can pass in the axial direction since the inner diameter is slightly larger than the outer diameter of the fastening flange 59 and an arc portion 65 extending from the large hole portion 64 toward one side in the circumferential direction and in the arc state around the rotation center of the one-side rim section 12, and the width W of this arc portion 65 is the same or larger than the outer diameter of the shaft body 58 and smaller than the outer diameter of the fastening flange 59, substantially the same as the outer diameter of the shaft body 58, here.

As a result, after each of the fastening shafts 57 is inserted into each of the fastening holes 63, if the one-side rim section 12 is to be rotated around the rotation center, the one-side rim section 12 can be rotated only when the fastening plate 62 is positioned between the adjacent fastening flanges 59. At this time, the shaft body 58 between the fastening flanges 59 is inserted into the arc portion 65 of the fastening hole 63. And when the shaft body 58 is inserted into the arc portion 65 in this way, the two fastening flanges 59 located on both sides of the fastening plate 62 in the axial direction are over-lapped in the axial direction on the fastening plate 62 so that the one-side and the other-side rim section 12 and 13 are fastened to each other.

And the above-mentioned fastening shaft 57 and fastening hole 63 formed on the fastening plate 62 constituting the one-side rim section 12 constitute a fastening means 66 as a whole, and in this preferred embodiment, the fastening means 35 made of the claw groups 20 and 30 described for the split rim 11 of the first preferred embodiment is omitted. By constituting the fastening means 66 by the fastening shaft 57 and the fastening plate 62 with the fastening hole 63 formed in this way, the one-side and the other-side rim sections 12, 13 can be strongly fastened to each other at a plurality of positions in the axial direction with a simple structure. Also, by providing a plurality of the fastening flanges 59 with an equal distance separated in the axial direction on the shaft body 58 as mentioned above, the one-side and the other-side rim sections 12, 13 can be surely fastened to each other at a plurality of fastening positions with displacement in the axial direction with a constant pitch with a simple structure.

Here, the inner diameter of the large hole portion 64 in any one of the fastening holes 63 may be made larger than the inner diameter of the large hole portion 64 of the remaining fastening holes 63, and the outer diameter of the fastening flange 59 in any one of the fastening shafts 57 may be made larger than the outer diameter of the remaining fastening flanges 59 corresponding to the large hole portion 64 whose inner diameter is made larger. In this way, only the fastening shaft 57 whose outer diameter is increased can be inserted to the fastening hole 63 with the larger inner diameter, and the relative positions in the circumferential direction of the one-side and the other-side rim sections 12 and 13 can be made constant all the time in fastening. At this time, the outer diameter of the shaft body 58 of the fastening shaft 57 whose outer and inner diameters are made larger and the width W of the arc portion 65 of the fastening hole 63 may be increased.

And when a rim/tire assembly 10A is to be assembled in this preferred embodiment, the pneumatic tire T is conveyed onto the other-side rim section 13 and the other-side (lower side) bead portion B2 of the pneumatic tire T is seated on the other-side rim section 13, and then, the one-side rim section 12 having waited immediately above the other-side rim section 13 is lowered by the conveying means and the cylinder portion 49 is inserted into its cylinder portion 50, while the one-side (upper side) bead portion B1 of the pneumatic tire T is seated on the one-side rim section 12. At this time, the fastening shaft 57 is inserted into the large hole portion 64 of the fastening hole 63, respectively, and when the insertion amount reaches a predetermined amount and the fastening plate 62 is positioned between the adjacent two fastening flanges 59, lowering of the one-side rim section 12 is stopped.

After that, when the one-side rim section 12 is rotated around the rotation center, the shaft body 58 between the adjacent fastening flanges 59 enters the arc portion 65 of the fastening hole 63, these fastening flanges 59 and the fastening plate 62 are overlapped with each other in the axial direction and the one-side and the other-side rim sections 12 and 13 are fastened to each other. Next, when the fluid is supplied to the tire chamber 46 and the fluid chamber 54 through the fluid passage 45, the piston 53 is raised toward the one-side rim section 12 and its tapered surface 52 is pressed into contact with the tapered surface 51. By this a part (tip end) of the inner cylinder portion 49 is elastically deformed and expanded by wedge action outward in the radial direction, and the inner and the outer cylinder portions 49 and 50 are brought into close contact with each other. The other constructions and actions are almost the same as those of the split rim 11 of the first preferred embodiment of the split rim.

In the split rim 11A of the second preferred embodiment, the fastening shaft 57 is provided on the other-side rim section 13 and the fastening hole 63 is formed in the one-side rim section 12, but in the present invention, the fastening shaft may be provided on the one-side rim section and the fastening hole on the other-side rim section. Also, in the split rim 11A of the second preferred embodiment, the shaft body 58 is in the columnar state, but it may be in the prism state in the present invention.

Moreover in the split rim 11A of the second preferred embodiment, the projection portion is comprised by the ring-state fastening flange 59, but in the present invention, it may be comprised by a plurality of claws separated in the circumferential direction. Also, it may be so constituted that the cylinder portion 49 in the split rim 11A of the second preferred embodiment is made of a solid columnar body and the outer diameter of the columnar body is made the same as the inner diameter of the cylindrical body 50 with high accuracy, by which the one-side and the other-side rim sections can be fastened to each other with high accuracy. Moreover, in the present invention, the number of the fastening shafts may be two or four or more.

Next, an installing device of the rim/tire assembly according to the present invention will be described.

Figure 7:
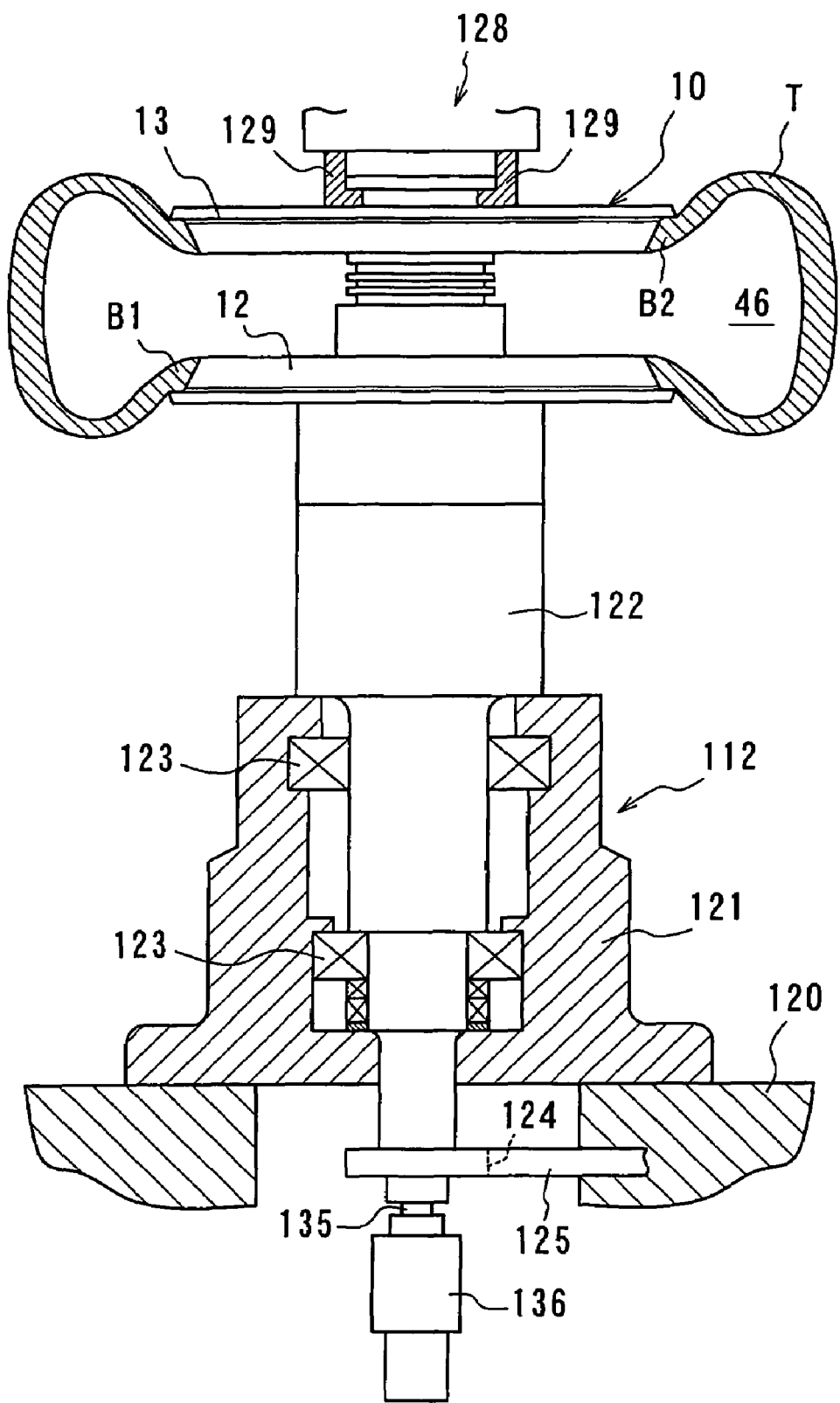
FIG. 7 is a partially broken front view showing the first preferred embodiment of an installing device for a rim/tire assembly according to the present invention.
Figure 8:
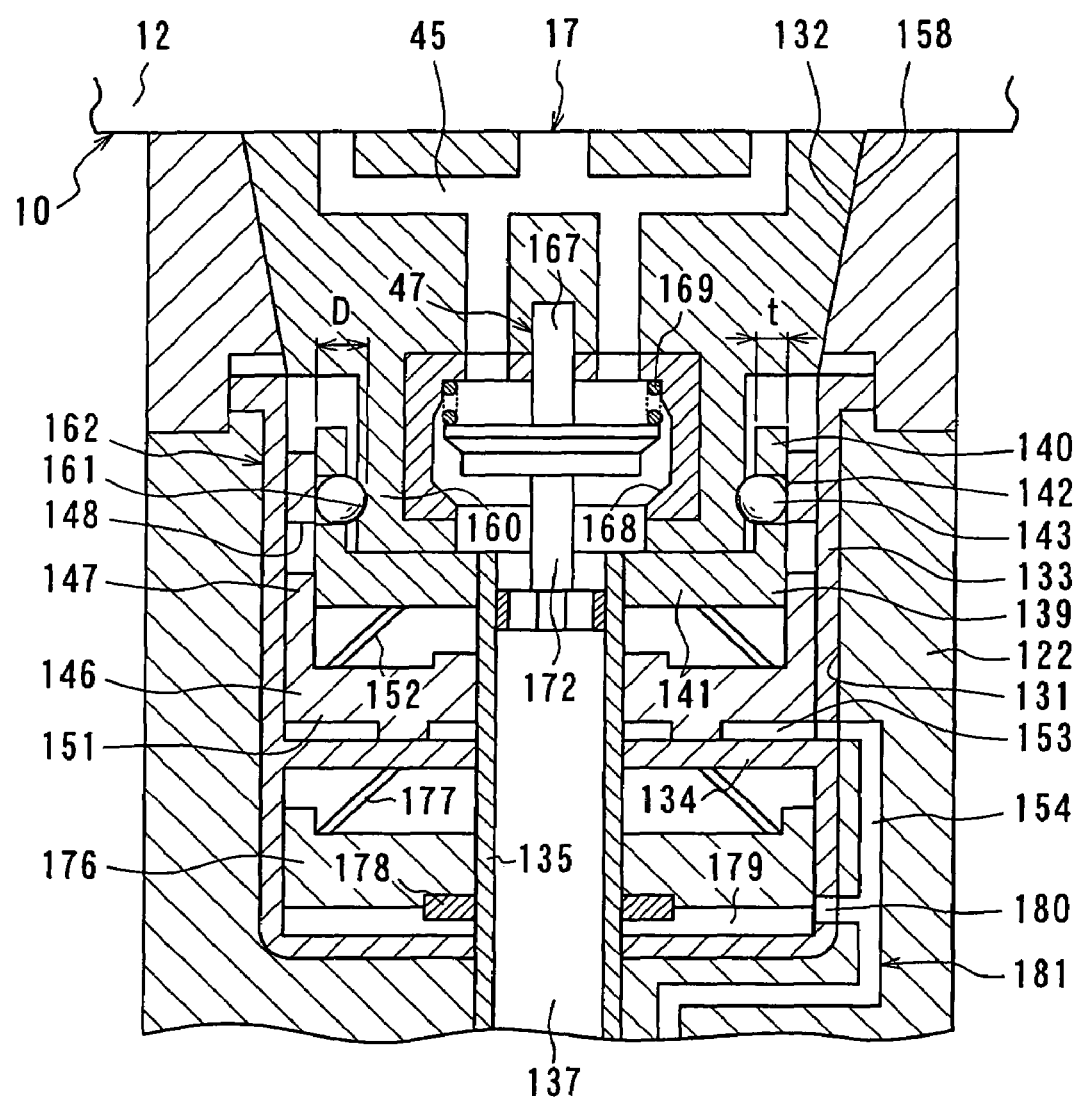
FIG. 8 is a front sectional view showing the vicinity of an attaching means of the installing device for a rim/tire assembly.

FIGS. 7 and 8 are a partially broken front view showing the first preferred embodiment of the rim/tire assembly and a front sectional view showing the vicinity of the installing means, respectively. The installing device of this preferred embodiment exemplifies an installing device used for installing the rim/tire assembly 10 assembled using the split rim 11 of the first preferred embodiment shown in FIG. 2 onto an inspecting machine.

In FIGS. 7 and 8, T denotes a vulcanized pneumatic tire to be inspected by an inspecting machine 112 such as a uniformity machine, a balance inspecting machine, etc., and the one-side and the other-side bead portions B1 and B2 of this pneumatic tire T are seated on the one-side and the other-side rim sections 12 and 13 detachably connected, respectively. That is, these one-side and other-side rim sections 12 and 13 are capable of separation, but it is possible that, after the one-side bead portion B1 of the pneumatic tire T is seated on the one-side rim section 12, the other-side bead portion B2 of the pneumatic tire T is seated on the other-side rim section 13 and then, these one-side and other-side rim sections 12 and 13 are connected by a connecting means, not shown.

And when the one-side and the other-side rim sections 12 and 13 on which the one-side and the other-side bead portions B1 and B2 of the pneumatic tire T have been seated in this way are connected to each other, the pneumatic tire T, the one-side and the other-side rim sections 12 and 13 are integrated so as to constitute the rim/tire assembly 10. The connection and release of the connection of the one-side and the other-side rim sections 12 and 13 are conducted at a rim assembling/disassembling stations far from the inspecting machine 112.

Reference numeral 120 denotes a frame of the inspecting machine 112, to this frame 120, a holding member 121 almost in the cylindrical shape is fixed and into this holding member 121, a spindle shaft 122 as a member to be attached extending vertically is inserted and supported rotatably by the holding member 121 with a plurality of bearings 123 separated in the axial direction. Reference numeral 124 denotes a pulley fixed to the lower end of the spindle shaft 122, and a belt 125 is extended between this pulley 124 and a pulley fixed to an output shaft of a motor, not shown, by which the spindle shaft 122 is rotated around a perpendicular axis at a predetermined rotating speed by receiving a driving force from the motor.

Reference numeral 128 denotes a conveying device which can convey the rim/tire assembly 10 from the rim assembling station to the inspecting machine 112, particularly, immediately above the spindle shaft 122 or from the spindle shaft 122 to another inspecting machine or the rim disassembling station. This conveying device 128 has a gripping claw 129 for gripping the rim/tire assembly 10, particularly, the other-side rim section 13.

And this conveying means 128 conveys the rim/tire assembly 10 in the state where the center axis of the pneumatic tire T is perpendicular and the one-side rim section 12 is on the lower side and the other-side rim section 13 on the upper side.

At the upper end of the spindle shaft 122, a housing hole 131 which is coaxial with the spindle shaft 122 and has its upper part opened is formed, and the inner circumference of the upper end of this housing hole 131 is a tapered surface 132 made of a part of a conical surface expanding upward. 133 is a cylindrical cylinder member with a bottom housed and fixed in the housing hole 131 farther (lower) than the tapered surface 132 and having its upper part opened, and a flange state partition wall 134 is integrally formed on the inner circumference at the center part of this cylinder member 133 in the axial direction. 135 is a perpendicular pipe penetrating the bottom wall of the cylinder member 133 and the partition wall 134 vertically and constituting a part of the spindle shaft 122, and inside this perpendicular pipe 35, a first fluid passage 137 for introducing a fluid such as air, inert gas, etc. is formed. And at the lower end of this perpendicular pipe 135, a rotary valve 136 which can supply fluid from a fluid source, not shown, into the rotating perpendicular pipe 135 (first fluid passage 137) is mounted.

Reference numeral 139 denotes a holder fixed to the upper end of the perpendicular pipe 135 and loosely fitted in the cylinder member 133, and this holder 139 is integrally formed with a cylinder portion 140 coaxial with the cylinder member 133 at the lower end of the cylinder portion 140 and its inner end in the radial direction is comprised by a disk portion 141 fixed to the outer circumference at the upper end of the perpendicular pipe 135. Reference numeral 142 denotes a plurality of ball holes formed with an equal distance apart in the circumferential direction on the cylinder portion 140, and these ball holes 142 penetrate the cylinder portion 140 in the radial direction. To each of the ball holes 142, a ball 143 capable of movement through the ball hole 142 in the radial direction is inserted, and the diameter D of these balls 143 is slightly larger than the holder 139, particularly the thickness t of the cylinder portion 140. As a result, a part of these balls 143 project from the inner circumference or the outer circumference of the holder 139 (cylinder portion 140).

Reference numeral 146 denotes a slider having a cylinder portion 147 fitted to the outside of the holder 139 (cylinder portion 140), and the inner circumference of this cylinder portion 147 is slidably engaged with the outer circumference of the cylinder portion 140, while the outer circumference is slidably engaged with the inner circumference of the cylinder member 133. A plurality of (the same number as that of the ball holes 142) escape holes 148 are formed on this cylinder portion 147 with an equal distance apart in the circumferential direction, and to these escape holes 148, a part of the balls 143 is inserted when the ball 143 is moved outward in the radial direction and becomes coaxial with the ball hole 142 by movement of the slider 146.

At this time, the ball 143 sinks in the ball hole 142 and the escape hole 148 and hardly projects from the inner circumference of the holder 139 (cylinder portion 140). In the meantime, when the slider 146 is moved in the axial direction (downward) from the state where the ball hole 142 and the escape hole 148 are coaxial as mentioned above, the ball 143 is engaged with the inner circumference of the slider 146 (cylinder portion 147) and pushed inward in the radial direction, and a part of there projects inward in the radial direction from the inner circumference of the holder 139 (cylinder portion 140).

The slider 146 has a disk portion 151 as a piston extending inward in the radial direction from the lower end of the cylinder portion 147, and to the center part of this disk portion 151, the perpendicular pipe 135 is slidably inserted. 152 is a disc spring interposed between the disk portion 141 of the holder 139 and the disk portion 151 of the slider 146, and this disc spring 152 applies a downward urging force to the slider 146. Reference numeral 153 denotes a cylinder chamber defined by the disk portion 151 of the slider 146 and the partition wall 134 of the cylinder member 133, and to this cylinder chamber 153, the other end of a fluid passage 154 formed in the spindle shaft 122 and having one end connected to the rotary valve 136 is made to communicate. And when the fluid is supplied to this cylinder chamber 153 through the fluid passage 154, the slider 146 is raised against the urging force of the disc spring 152, and the ball 143 becomes capable of escape in the escape hole 148.

Reference numeral 17 denotes a projecting block almost in the columnar shape formed on the rim/tire assembly 10, particularly at the center part of the one-side rim section 12 and projecting outward in the axial direction (downward during conveying), and this projecting block 17 is inserted into the housing hole 31 when the rim/tire assembly 10 is conveyed by the conveying means 28 to the spindle shaft 22. Here, the base end (upper end) outer circumference of this projecting block 17 constituted a tapered surface 158 made of a part of a conical surface with the same tapering angle as the tapered surface 132, and as a result, this tapered surface 158 and the tapered surface 132 makes a contact part to be brought into surface contact with each other when the rim/tire assembly 10 is conveyed to the spindle shaft 122.

Also, the projecting block 17 has at its tip end side (lower end) a cylindrical coupling portion 160 with the outer diameter slightly smaller than the inner circumference of the cylinder portion 140 of the holder 139, and this coupling portion 160 is inserted into the holder 139, particularly the cylinder portion 140, when the tapered surfaces 132 and 158 are brought into surface contact with each other by conveyance of the rim/tire assembly 10. Also, when the tapered surfaces 132 and 158 are in surface contact with each other, a recess 161 in the circumferential groove shape opposite to the ball 143 is formed on the outer circumference of this connection portion 160, and when the ball 143 is pressed inward in the radial direction by the slider 146, a part of this ball 143 is inserted in this recess 161, which attaches and fixes the rim/tire assembly 10 conveyed to the spindle shaft 122 at a predetermined position of the spindle shaft 122.

The holder 139, the ball 143, the slider 146 provided on the spindle shaft 122 and the recess 161 formed on the outer surface of the connection portion 160 constitute as a whole an attaching means 62 to attach/fix the rim/tire assembly 10 having been conveyed to the spindle shaft 122 at a predetermined position of the spindle shaft 122. And by constituting the attaching means 162 in this way with the holder 139, the ball 143, the slider 146 and the recess 161, the rim/tire assembly 10 can be attached/fixed to the spindle shaft 122 in an extremely short time.

In the rim/tire assembly 10 including the projecting block 17, a second fluid passage 45 having one end communicating to the fluid chamber 46 surrounded by the pneumatic tire T, the one-side and the other-side rim sections 12, 13 and the other end opened on the tip end face of the projecting block 17 is formed, and when the rim/tire assembly 10 is attached/fixed to the spindle shaft 122, this second fluid passage 45 is made to communicate to the first fluid passage 137. The opening/closing valve 47 is provided at the other end of the second fluid passage 45, that is, a part positioned in the coupling portion 160, and this opening/closing valve 47 is comprised by a valve body 167 supported by the projecting block 17 capable of movement in the axial direction and a spring 169 for urging the valve body 167 outward in the axial direction and pressing the valve body 167 onto a valve seat 168, and the valve is in the closed state at a normal time when the upward external force (valve opening force) is not applied to the valve body 167.

Reference numeral 172 denotes an opening member with the lower end fixed to the inner circumference at the upper end of the perpendicular pipe 135, and the upper side portion of this opening member 172 projects upward from the upper surfaces of the perpendicular pipe 135 and the disk portion 141. As a result, when the projecting block 17 is inserted into the housing hole 131 and the rim/tire assembly 10 is attached/fixed to the spindle shaft 122, the opening member 172 presses the valve body 167 inward in the axial direction (upward) against the spring 169 and switches the opening/closing valve 47 from the closed state to the opened state.

When the opening/closing valve 47 is brought into the open state in this way, the fluid is introduced from the fluid source to the fluid chamber 46 through the first and the second fluid passages 137 and 45 communicating to each other and expands the pneumatic tire T to a predetermined shape at inspection. By providing the opening/closing valve 47 on the second fluid passage 45 and the opening member 172 on the spindle shaft 122 for switching the opening/closing valve 47 to the opened state, the opening/closing valve 47 is kept in the closed state at the normal time when the rim/tire assembly 10 is removed from the spindle shaft 122, and the rim/tire assembly 10 can be conveyed with internal pressure filled in the fluid chamber 46.

Reference numeral 176 denotes a ring-state piston provided between the bottom wall of the cylinder member 133 and the partition wall 134, and the outer circumference of this piston 176 is engaged with the inner circumference of the cylinder member 133 and its inner circumference with the outer circumference of the perpendicular pipe 135 slidably. Reference numeral 177 denotes a disc spring provided between the piston 176 and the partition wall 134, and this disc spring 177 applies a downward urging force to the piston 176.

Reference numeral 178 denotes a contact ring fixed to the outer circumference of the perpendicular pipe 135, and with this contact ring 178, the piston 176 pressed down by the disc spring 177 can be brought into contact. At this contact, the downward urging force from the disc spring 177 and the piston 176 is transmitted to the projecting block 17 (rim/tire assembly 10) through the perpendicular pipe 135, the holder 139 and the ball 143 so that the tapered surfaces 158 and 132 are pressed into contact with each other. By this, the attachment accuracy of the rim/tire assembly 10 with respect to the spindle shaft 122, concentricity, for example, is effectively improved.

Reference numeral 179 denotes a cylinder chamber defined by the piston 176 and the bottom wall of the cylinder member 133, and to this cylinder chamber 179, a branch passage 180 branched from the middle of the fluid passage 154 is connected. And when the fluid is supplied to this cylinder chamber 179 through the fluid passage 154 and the branch passage 180, the piston 176 is raised against the urging force of the disc spring 177 and shuts down the urging force transmitted from the disc spring 177 to the perpendicular pipe 135 in the middle. The piston 176, the disc spring 177, and the contact ring 178 constitute as a whole a force applying means 181 for applying a pressing force to the rim/tire assembly 10 for pressing the tapered surfaces 132 and 158 into contact with each other.

Next, the action of the above-mentioned first preferred embodiment of the installing device for the rim/tire assembly will be described. Now suppose that the rim/tire assembly 10 is not attached to the spindle shaft 122 of the inspecting machine 112. At this time, the fluid is supplied from the fluid source to the cylinder chambers 153 and 179 through the fluid passage 154 and the branch passage 180, and as a result, the slider 146 and the piston 176 are raised together against the disc springs 152 and 177. Here, if the slider 146 is raised as mentioned above, the escape hole 148 becomes coaxial with the ball hole 142, and by this, the ball 143 sinks in the ball hole 142 and the escape hole 148 and hardly projects from the inner circumference of the holder 139 (cylinder portion 140). In the meantime, if the piston 176 is raised, the piston 176 is removed from the contact ring 178 and as a result, the urging force from the disc spring 177 is not transmitted to the perpendicular pipe 135.

Next, after the rim/tire assembly 10 assembled at the rim assembling station is gripped by the conveying means 128, the assembly is conveyed to the spindle shaft 122 of the inspecting machine 112 in the state where the center axis of the pneumatic tire T is perpendicular, and the projecting block 17 is inserted into the housing hole 131. At this insertion, the valve body 167 is pressed inward in the axial direction (upward) by the opening member 172 while compressing the spring 169, and the opening/closing valve 47 is switched from the closed state to the open state. And the tapered surface 158 of the projecting block 17 is brought into contact with the tapered surface 132 of the spindle shaft 122, and when the rim/tire assembly 10 is conveyed to the predetermined position of the spindle shaft 122, the first fluid passage 137 of the spindle shaft 122 and the second fluid passage 45 of the rim/tire assembly 10 are made to communicate to each other. At this time, the conveying means 128 releases gripping of the rim/tire assembly 10 and moves to the next working position.

Next, the fluid is discharged from the cylinder chambers 153 and 179 through the fluid passage 154 and the branch passage 180, but with this fluid discharge, the slider 146 is pressed down by the urging force of the disc spring 152. As a result, the ball 143 is pressed to the inner circumference of the slider 146 (cylinder portion 147) and moves in the ball hole 142 inward in the radial direction, and a part thereof is inserted in the recess 161, and the rim/tire assembly 10 conveyed to the spindle shaft 122 is attached/fixed in a moment at the predetermined position of the spindle shaft 122.

In the meantime, the piston 176 is pressed down by the urging force of the disc spring 177 due to fluid discharge from the above-mentioned cylinder chamber 179, and the piston 176 is brought into contact with the contact ring 178. As a result, the downward urging force of the disc spring 177 is transmitted through the perpendicular pipe 135, the holder 139 and the ball 143 to the projecting block 17 (rim/tire assembly 10) and presses the tapered surface 158 into contact with the tapered surface 132.

After that, a fluid of a predetermined pressure is supplied from the fluid source into the fluid chamber 46 through the first and the second fluid passages 137 and 45 so as to expand the pneumatic tire T to a predetermined shape at inspection. Next, the motor is operated to transmit the rotating/driving force to the spindle shaft 122 through the belt 125, and while rotating the spindle shaft 122 and the rim/tire assembly 10 integrally at a predetermined rotation speed around the perpendicular axis, the pneumatic tire T is inspected by an inspecting means, not shown, for uniformity, for example.

At this time, the rim/tire assembly 10 having been conveyed to the spindle shaft 122 as mentioned above is attached/fixed at the predetermined position of the spindle shaft 122 by the attaching means 162, and no displacement occurs at the attachment position of the rim/tire assembly 10 with respect to the spindle shaft 122, and as a result, leakage of the fluid lead into the fluid chamber 46 through the first and the second fluid passages 137 and 45 is prevented.

Also, since the rim/tire assembly 10 is attached/fixed to the spindle shaft 122 by the attaching means 162, no slippery in the rotation direction occurs between the rim/tire assembly 10 and the spindle shaft 122 even if an inertia force and a braking force act on the rim/tire assembly 10 at inspection, by this inspection accuracy can be improved.

Also, at this time, the above construction hardly allows the spindle shaft 122 and the rim/tire assembly 10 to bend but reliability can be improved even if an external force (lateral force) for inspection acts on the rim/tire assembly 10 when it is stopped or rotated. Moreover, in this preferred embodiment, since the attachment/fixation of the rim/tire assembly 10 to the spindle shaft 22 is performed by the urging force of the disc spring 152, the attachment/fixation can be maintained even in the case of outage, failure of the fluid source, etc., by which safety is improved.

When inspection of the pneumatic tire T is completed in the inspecting machine 112 as mentioned above, the fluid is supplied to the cylinder chambers 153 and 179 through the fluid passage 154 and the branch passage 180 so as to raise the slider 146 and the piston 176 to release the rim/tire assembly 10 from the attachment/fixation by the attaching means 162, and press contact between the tapered surface 158 and the tapered surface 132 is finished.

Next, after the rim/tire assembly 10 is gripped by the conveying means 128, the rim/tire assembly 10 is conveyed to the next process, a balance inspecting machine, trimming machine or rim disassembling station, for example. At this time, since the valve body 167 is pressed by the spring 169 onto the valve seat 168 and the opening/closing valve 66 is automatically switched to the closed state, the rim/tire assembly 10 can be conveyed in the state where internal pressure is filled in the fluid chamber 163.

Figure 9:
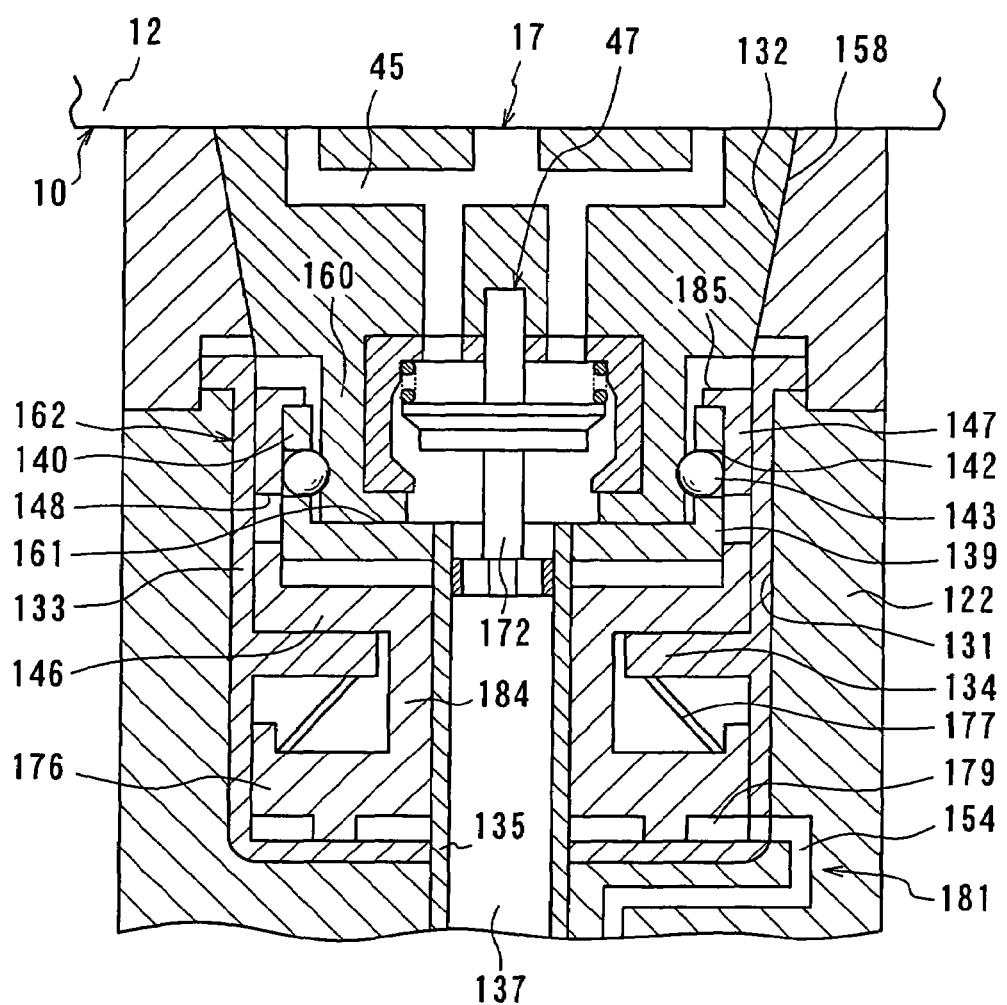
FIG. 9 is a front sectional view showing the vicinity of an attaching means of the installing device for a rim/tire assembly according to the second preferred embodiment.

FIG. 9 shows a second preferred embodiment of the installing device for the rim/tire assembly according to the present invention. In this preferred embodiment, the disc spring 152, the cylinder chamber 153 and the contact ring 178 in the installing device for the rim/tire assembly of the first preferred embodiment are omitted, the slider 146 and the piston 176 are integrally connected with a cylindrical connecting body 184 having the inner circumference in sliding contact with the perpendicular pipe 135, and a ring-state projection 85 capable of contact with the upper face of the cylinder portion 140 of the holder 139 is formed on the inner circumference at the upper end of the cylinder portion 147 of the slider 146. And the fluid passage 154 is made to communicate only to the cylinder chamber 179.

And in this preferred embodiment, when attaching/fixing the rim/tire assembly 10 to the spindle shaft 122, the fluid supplied to the cylinder chamber 179 is discharged through the fluid passage 154. As a result, the slider 146, the piston 176 and the connecting body 184 are integrally pressed down by the urging force of the disc spring 177, and at this time, the ball 143 is pressed by the cylinder portion 147 and moved inward in the radial direction and a part thereof is inserted in the recess 161. By this, the rim/tire assembly 10 is attached/fixed to the predetermined position of the spindle shaft 122. At this time, the ring state projection 185 is brought into contact with the upper surface of the cylinder portion 140 to transmit the downward urging force of the disc spring 177 to the projecting block 17 through the holder 139 and the ball 143, and the tapered surfaces 132 and 158 are pressed into contact with each other.

In this preferred embodiment, the holder 139, the ball 143, the slider 146, the recess 161, the piston 176 and the connecting body 184 are used in common by the attaching means and the force applying means in this way, and as a result, its structure is simpler than the installing device for the rim/tire assembly of the first preferred embodiment and it can be manufactured with reduced costs. The other construction and action are the same as those of the installing device for the rim/tire assembly of the first preferred embodiment.

Figure 10:
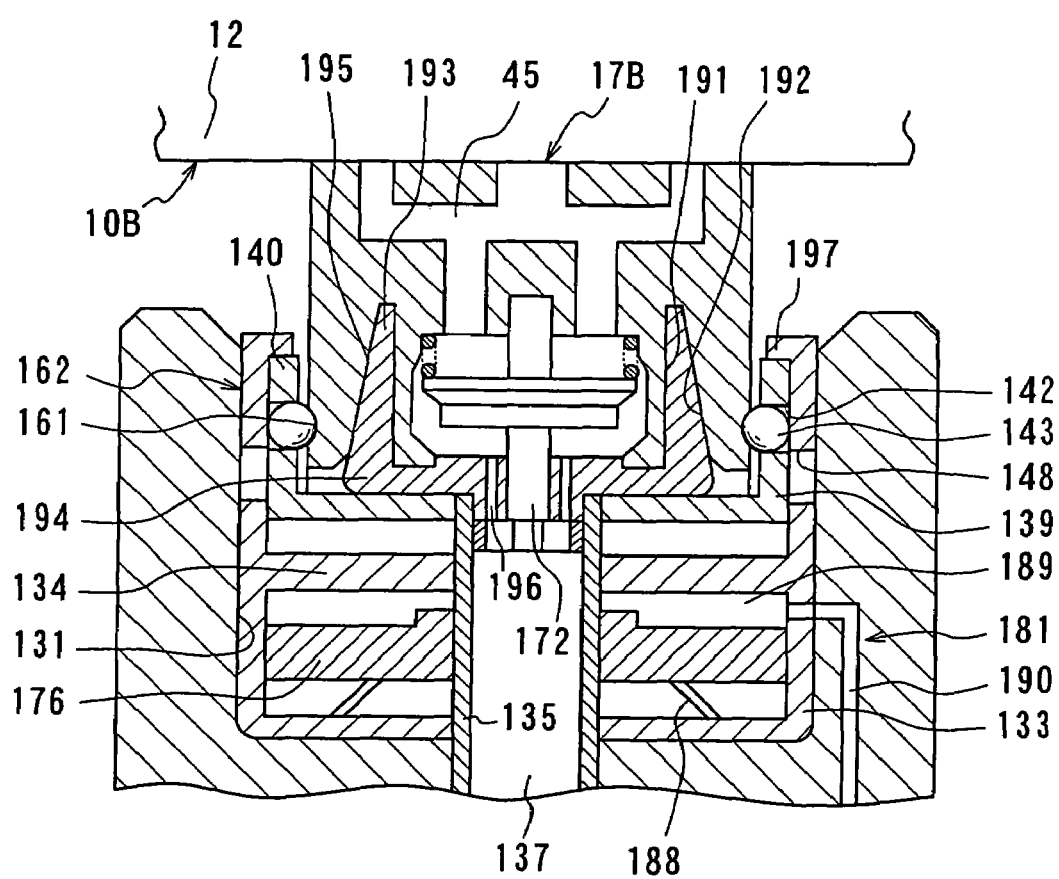
FIG. 10 is a front sectional view showing the vicinity of an attaching means of the installing device for a rim/tire assembly according to the third preferred embodiment.

FIG. 10 is a view showing a third preferred embodiment of the installing device for the rim/tire assembly according to the present invention. In this preferred embodiment, the cylinder member 133 in the installing device for the rim/tire assembly of the first preferred embodiment is inserted into the housing hole 131 capable of vertical movement, and the slider 146, the disc springs 152 and 177 are omitted. Then, the escape hole 148 is formed on the cylinder member 133 externally fitted with the holder 139 capable of sliding. Also, the piston 176 arranged between the bottom wall of the cylinder member 133 and the partition wall 134 is fixed to the perpendicular pipe 135, while a disc spring 188 for applying the downward urging force to the cylinder member 133 is provided between the bottom wall of the cylinder member 133 and the piston 176, and a fluid passage 190 for supplying/discharging the fluid to/from a cylinder chamber 189 formed between the piston 176 and the partition wall 134 is formed in the spindle shaft 122.

Moreover, in this preferred embodiment, in place of the projecting block 17, a projecting block 17B is provided, and on the tip end face (lower end face) of the projecting block 17B, a cylindrical groove 191 almost in the cylindrical state coaxial with the perpendicular pipe 135 is formed, and the outer circumferential surface of the cylindrical groove 191 is made as a tapered surface 192 made of a part of a conical surface tapered inward in the axial direction (upward), while a locking body 194 having a cylinder portion 193 to be inserted into the cylindrical groove 191 is mounted on the perpendicular pipe 135 and the holder 139. And the outer circumferential surface of the cylinder portion 193 is comprised by a tapered surface 195 which is capable of surface contact with the tapered surface 192 and has the same tapering angle.

Also, in this preferred embodiment, a through hole 196 having the first fluid passage 137 to communicate with the second fluid passage 45 is formed on the locking body 194, and a ring-state projection 197 capable of contact with the upper surface of the cylinder portion 140 of the holder 139 is formed on the inner surface at the upper end of the cylinder member 133. In this way, in this preferred embodiment, the tapered surface is not formed, as in the installing device for the rim/tire assembly of the first preferred embodiment, on the inner circumference of the spindle shaft 122 and the outer circumference of the projecting block 17 but on the outer circumference of the locking body 94 fixed to the spindle shaft 122 and the outer circumference of the cylindrical groove 191 formed on the projecting block 17 and made tapered upward.

And in this preferred embodiment, when attaching/fixing a rim/tire assembly 10B on the spindle shaft 122, the fluid supplied to the cylinder chamber 189 is discharged through the fluid passage 190. As a result, the cylinder member 133 is pressed down by the urging force of the disc spring 188, and at this time, the ball 143 is pressed by the cylinder member 133 and moved inward in the radial direction and a part thereof is inserted in the recess 161. By this, the rim/tire assembly 10B is attached/fixed at the predetermined position of the spindle shaft 122. At this time, the upward urging force of the disc spring 188 is transmitted to the locking body 194 through the perpendicular pipe 135, and the tapered surface 195 of the locking body 194 and the tapered surface 192 of the projecting block 17B are pressed into contact.

In this way, in this preferred embodiment, the piston 176 and the disc spring 188 are used in common by the attaching means and the force applying means, and as a result, its structure is simpler than the installing device for the rim/tire assembly of the first preferred embodiment and it can be manufactured with reduced costs. The other construction and action are the same as those of the installing device for the rim/tire assembly of the first preferred embodiment.

Figure 11:
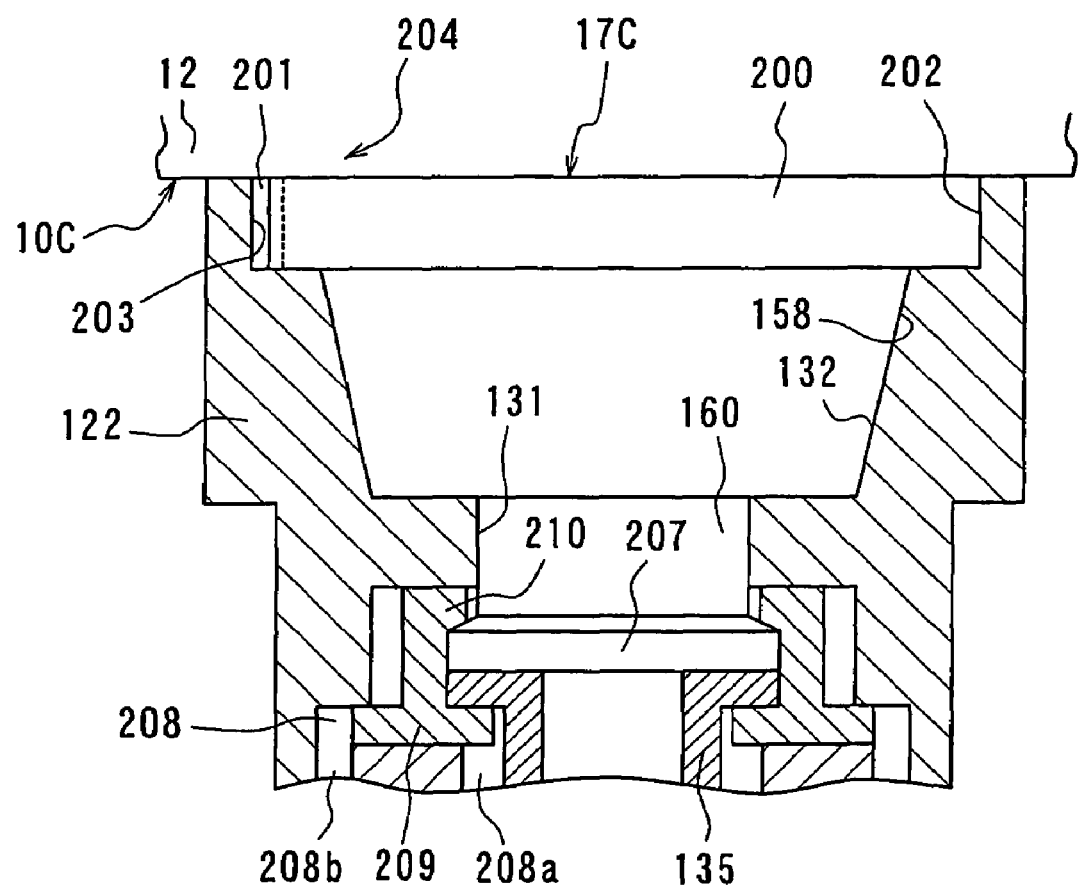
FIG. 11 is a front sectional view showing the vicinity of an attaching means of the installing device for a rim/tire assembly according to the fourth preferred embodiment.

FIG. 11 is a view showing a fourth preferred embodiment of the installing device for the rim/tire assembly according to the present invention. In this preferred embodiment, a columnar portion 200 with the diameter larger than the maximum diameter of the tapered surface 158 is formed on a projecting block 17C on the base end side from the tapered surface 158, and a key 201 extending in the axial direction (vertical direction) is fixed to the outer circumference of the columnar portion 200, while a ring-state portion 202 fitted with the columnar portion 200 is formed at the upper end of the housing hole 131, and a keyway groove 203 to which the key 201 is inserted is formed on the inner circumference of the ring-state portion 202.

The above-mentioned key 201 and the keyway 203 as a whole constitute a positioning means 204 for positioning/fixing the positions in the rotating direction of a rim/tire assembly 10C and the spindle shaft 122, and by providing this positioning means 204, the positions in the rotating direction of the rim/tire assembly 10C and the spindle shaft 122 at attachment/fixation can be made constant all the time, and by this, communication between the first and the second fluid passages can be ensured. Also, such a state that the rim/tire assembly 10C slips in the rotating direction with respect to the spindle shaft 122 at rotation of the rim/tire assembly 10C can be surely prevented.

Also, in this preferred embodiment, a locking flange 207 in the inclined ring state so that the upper surface is tapered upward is formed on the outer circumference at the lower end of the coupling portion 160, a plurality of cylinder chambers 208 separated in the circumferential direction are formed on the spindle shaft 122 around the locking flange 207, and lower ends of movable bodies 209 capable of movement in the radial direction are housed in these cylinder chambers 208, by which the cylinder chamber 208 is divided into an inner cylinder chamber 208a and an outer cylinder chamber 208b.

Also, at the upper end of these movable bodies 209, locking projections 210 projecting inward in the radial direction are formed, and these locking projections 210 are engaged with the upper faces of the locking flanges 207 when the fluid is supplied to the outer cylinder chamber 208b and the movable bodies 209 are synchronously moved inward in the radial direction so as to attach/fix a projecting block 17C (rim/tire assembly 10C) to the spindle shaft 122.

In the first to the fourth preferred embodiments of the installing device for the rim/tire assembly described above, it is preferable that a fastening means shown in the first or the second preferred embodiment is used for fastening the one-side rim section 12 and the other-side rim section 13 constituting the rim/tire assembly to be attached for further improvement of the inspection accuracy, but not limited to them.

INDUSTRIAL APPLICABILITY

The present invention can be used as a split rim to be a rim/tire assembly in combination with a tire, a method for assembling the rim/tire assembly and a method and device of installing the rim/tire assembly to an inspecting machine when inspecting a pneumatic tire for uniformity or balance.

The invention claimed is:

1. A split rim for a tire comprising:
a one-side rim section on which a one-side bead portion of a pneumatic tire is seated and which has an outer cylindrical portion in an approximately cylindrical shape projecting inward in the axial direction;
an other-side rim section on which the other-side bead portion of said pneumatic tire is seated and which has an inner cylindrical portion in an approximately cylindrical shape projecting inward in the axial direction and inserted into the outer cylindrical portion of said one-side rim section;
a fastening means for fastening said one-side and the other-side rim sections to each other when the cylindrical portions of the one-side and the other-side rim sections are overlaid due to said insertion; and
an expanding means for expanding a part of the inner cylindrical portion at said overlaid part outward in the radial direction to bring the inner and the outer cylindrical portions into close contact,
wherein the fastening means of the one-side rim section and the fastening means of the other-side rim section constitute a bayonet type fastening means for fastening the one-side rim section and the other-side rim section with each other.

2. A split rim for a tire according to claim 1, wherein said expanding means comprises a piston to be movably inserted into either of the cylindrical portions in the axial direction and having a tapered surface whose thickness is gradually reduced toward a tip end of the inner cylindrical portion; and a fluid chamber for expanding a part of the inner cylindrical portion by the tapered surface of the piston by having a fluid pressure to act on the piston to move it toward the tip end when a fluid is supplied.

3. A split rim for a tire comprising:

a one-side rim section on which a one-side bead portion of a pneumatic tire is seated and which has an outer cylindrical portion in an approximately cylindrical shape projecting inward in the axial direction;

an other-side rim section on which the other-side bead portion of said pneumatic tire is seated and which has an inner cylindrical portion in an approximately cylindrical shape projecting inward in the axial direction and inserted into the outer cylindrical portion of said one-side rim section;

a fastening means for fastening said one-side and the other-side rim sections to each other when the cylindrical portions of the one-side and the other-side rim sections are overlaid due to said insertion; and an expanding means for expanding a part of the inner cylindrical portion at said overlaid part outward in the radial direction to bring the inner and the outer cylindrical portions into close contact, wherein said fastening means is provided on either of the one-side rim section or the other-side rim section with an equal distance from a rotation center and comprises a shaft body extending toward the other remaining rim section in the axial direction, a plurality of fastening shafts made of projections projected outward from the shaft body, and a plurality of penetrating fastening holes formed on the other remaining rim section with an equal distance from the rotation center and made of a large hole portion through which said projections can pass in the axial direction and an arc portion extending from each of the large hole portions toward the one side in the circumferential direction and having the width which is the same as or larger than the shaft body and smaller than the projections.

4. A split rim for a pneumatic tire according to claim 1, wherein said fastening means can fasten the one-side rim section and the other-side rim section at a plurality of positions in the axial direction.

5. A split rim for a pneumatic tire according to claim 3, wherein a plurality of projections are provided equally spaced from each other on said shaft body in the axial direction so that the one-side rim section and the other-side rim section can be fastened at a plurality of axial positions.

6. A method of assembling a rim/tire assembly comprising:

a process of overlaying cylindrical portions of a one-side and the other-side rim sections by seating a one-side bead portion of a pneumatic tire on the one-side rim section and the other-side bead portion on the other side rim section as well as by inserting the cylindrical portion in the approximately cylindrical shape of the other-side rim section projecting inward in the axial direction into the cylindrical portion in the approximately cylindrical shape of the one-side rim section projecting inward in the axial direction; and a process of bringing the cylindrical portions on the inner and the outer sides into close contact by fastening said one-side and the other-side rim sections to each other with a fastening means and expanding a part of the inner cylindrical portion in the overlaid part outward in the radial direction with an expanding means, wherein the fastening means of the one-side rim section and the fastening means of the other-side rim section constitute a bayonet type fastening means for fastening the one-side rim section and the other-side rim section with each other, wherein the fastening means includes claws provided on the inner periphery of the cylindrical portion of the one-side rim section and the claws provided on the outer periphery of the cylindrical portion of the other-side rim section, wherein the claws of the one-side rim section and the claws of the other-side rim section are engaged with each other when fluid under pressure is supplied to a tire chamber of the tire to generate a force in a direction to separate the one-side rim section and the other-side rim section from each other and for setting the rim width to a predetermined value and wherein when fluid under pressure is supplied to said expanding means, relative rotation between the one-side rim section and the other-side rim section is prevented.

7. A split rim for a tire comprising:

a one-side rim section on which a one-side bead portion of a pneumatic tire is seated and which has an outer cylindrical portion in an approximately cylindrical shape projecting inward in the axial direction;

an other-side rim section on which the other-side bead portion of said pneumatic tire is seated and which has an inner cylindrical portion in an approximately cylindrical shape projecting inward in the axial direction and inserted into the outer cylindrical portion of said one-side rim section;

a fastening means for fastening said one-side and the other-side rim sections to each other when the cylindrical portions of the one-side and the other-side rim sections are overlaid due to said insertion; and an expanding means for expanding a part of the inner cylindrical portion at said overlaid part outward in the radial direction to bring the inner and the outer cylindrical portions into close contact, wherein the fastening means of the one-side rim section and the fastening means of the other-side rim section constitute a bayonet type fastening means for fastening the one-side rim section and the other-side rim section with each other, wherein the fastening means includes claws provided on the inner periphery of the cylindrical portion of the one-side rim section and the claws provided on the outer periphery of the cylindrical portion of the other-side rim section, and wherein the claws of the one-side rim section and the claws of the other-side rim section are engaged with each other when fluid under pressure is supplied to a tire chamber of the tire to generate a force in a direction to separate the one-side rim section and the other-side rim section from each other and for setting the rim width to a predetermined value and wherein when fluid under pressure is supplied to the expanding means, relative rotation between the one-side rim section and the other-side rim section is prevented.

* * * * *